United States Patent
Sirotkin et al.

(10) Patent No.: US 10,194,367 B2
(45) Date of Patent: Jan. 29, 2019

(54) SYSTEMS, DEVICES, AND METHODS FOR LONG TERM EVOLUTION AND WIRELESS LOCAL AREA INTERWORKING

(71) Applicant: Intel IP Corporation, Santa Clara, CA (US)

(72) Inventors: Alexander Sirotkin, Petach Tikva (IL); Hyung-Nam Choi, Hamburg (DE); Nageen Himayat, Fremont, CA (US); Richard Burbidge, Shrivenham (GB); Mo-Han Fong, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/820,280

(22) Filed: Nov. 21, 2017

(65) Prior Publication Data
US 2018/0077622 A1    Mar. 15, 2018

Related U.S. Application Data

(63) Continuation of application No. 15/260,020, filed on Sep. 8, 2016, now Pat. No. 9,894,586, which is a
(Continued)

(51) Int. Cl.
*H04W 76/20* (2018.01)
*H04W 76/27* (2018.01)
(Continued)

(52) U.S. Cl.
CPC ....... *H04W 36/30* (2013.01); *H04W 36/0066* (2013.01); *H04W 36/14* (2013.01);
(Continued)

(58) Field of Classification Search
CPC . H04W 36/0066; H04W 76/27; H04W 36/08; H04W 76/046
See application file for complete search history.

(56) References Cited

U.S. PATENT DOCUMENTS

| | | | |
|---|---|---|---|
| 2005/0059400 A1* | 3/2005 | Jagadeesan | ........... H04W 36/30 455/436 |
| 2007/0091839 A1* | 4/2007 | Abdelhamid | ......... H04W 8/005 370/329 |

(Continued)

FOREIGN PATENT DOCUMENTS

| | | |
|---|---|---|
| KR | 20050104388 A | 11/2005 |
| KR | 20130094826 A | 8/2013 |

(Continued)

OTHER PUBLICATIONS

Extended European Search Report dated Dec. 13, 2017 from European Patent Application No. 15789818.0, 16 pages.
(Continued)

*Primary Examiner* — Ronald B Abelson
(74) *Attorney, Agent, or Firm* — Schwabe, Williamson & Wyatt, P.C.

(57) ABSTRACT

Embodiments of the present disclosure describe systems, devices, and methods for long-term evolution and wireless local area interworking. Various embodiments may include utilizing access network selection and traffic steering rules based on radio access network assistance parameters. Other embodiments may be described or claimed.

14 Claims, 4 Drawing Sheets

Related U.S. Application Data continuation of application No. 14/583,027, filed on Dec. 24, 2014, now Pat. No. 9,467,921.

(60) Provisional application No. 62/029,936, filed on Jul. 28, 2014, provisional application No. 61/990,694, filed on May 8, 2014.

(51) Int. Cl.

| | |
|---|---|
| *H04W 36/00* | (2009.01) |
| *H04W 36/14* | (2009.01) |
| *H04W 36/22* | (2009.01) |
| *H04W 36/30* | (2009.01) |
| *H04W 36/10* | (2009.01) |
| *H04W 84/12* | (2009.01) |
| *H04W 88/06* | (2009.01) |
| *H04W 28/08* | (2009.01) |

(52) U.S. Cl.
CPC .......... *H04W 36/22* (2013.01); *H04W 76/20* (2018.02); *H04W 76/27* (2018.02); *H04W 28/08* (2013.01); *H04W 84/12* (2013.01); *H04W 88/06* (2013.01)

(56) References Cited

U.S. PATENT DOCUMENTS

| | | |
|---|---|---|
| 2010/0291863 A1 | 11/2010 | Hsu et al. |
| 2012/0023189 A1 | 1/2012 | Giaretta et al. |
| 2013/0031271 A1 | 1/2013 | Bosch et al. |
| 2013/0242897 A1 | 9/2013 | Meylan et al. |
| 2013/0308445 A1 | 11/2013 | Xiang et al. |
| 2014/0079022 A1 | 3/2014 | Wang et al. |
| 2014/0092731 A1 | 4/2014 | Gupta |
| 2014/0092742 A1 | 4/2014 | Chou |
| 2014/0099955 A1* | 4/2014 | Nukala ............... H04W 36/00 455/436 |
| 2014/0153511 A1 | 6/2014 | Sirotkin |
| 2014/0233386 A1 | 8/2014 | Jamadagni et al. |
| 2015/0195743 A1 | 7/2015 | Sirotkin et al. |
| 2015/0195759 A1 | 7/2015 | Sirotkin et al. |
| 2015/0271729 A1 | 9/2015 | Sirotkin et al. |
| 2015/0327139 A1 | 11/2015 | Sirotkin et al. |
| 2015/0382281 A1 | 12/2015 | Sirotkin |
| 2016/0021570 A1 | 1/2016 | Sirotkin et al. |
| 2016/0044550 A1 | 2/2016 | Lee et al. |

FOREIGN PATENT DOCUMENTS

| | | |
|---|---|---|
| RU | 2421941 C2 | 6/2011 |
| WO | 2012/040251 A2 | 3/2012 |
| WO | 2014/113103 A1 | 7/2014 |
| WO | 2014163696 A1 | 10/2014 |
| WO | 2014/182341 A1 | 11/2014 |

OTHER PUBLICATIONS

Office Action dated Oct. 27, 2016 from U.S. Appl. No. 14/583,057, 18 pages.
Office Action dated May 18, 2017 from U.S. Appl. No. 14/583,057, 25 pages.
Notice of Allowance dated Aug. 28, 2017 from U.S. Appl. No. 14/583,057, 21 pages.
Siris et al., "Performance and Energy Efficiency of Mobile Data Offloading with Mobility Prediction and Prefetching," World of Wireless, Mobile and Multimedia Networks (WoWMoM), 2013 IEEE 14th International Symposium and Workshops pm a. IEEE, 2013, Jun. 4-7, 2013 Section I, II, III, 6 pages.
Intel Corporation, "Connected mode procedures and RRC signaling of WLAN/3GPP Radio Interworking for LTE," 3GPP TSG-RAN WG2 Meeting #85bis, R2-141757, Current version: 12.1.0, Work item code: UTRA_LTD_WLAN_interw-Core, Mar. 31-Apr. 4, 2014, Valencia, Spain, 16 pages.
Intel Corporation, "Connected mode procedures and RRC signaling of WLAN/3GPP Radio Interworking for LTE," 3GPP TSG-RAN WG2 Meeting #85bis, R2-141625, Change Request 36.331, CR CRNum, rev. Current version: 12.1.0, Mar. 31-Apr. 4, 2014, Valencia, Spain, 9 pages.
Alcatel-Lucent et al., "Stage 3 design considerations for 3GPP-WIFI radio interworking," 3GPP TSG-RAN WG RAN3#85bis, R2-141574, Agenda Item: 5.1.3, Mar. 31-Apr. 4, 2014, Valencia, Spain, 4 pages.
International Search Report and Written Opinion dated Jul. 31, 2015 from International Application No. PCT/US2015/027123.
Office Action dated Mar. 28, 2016 from Taiwan Patent Application No. 104110683, 11 pages.
International Search Report and Written Opinion dated Aug. 17, 2015 from International Application No. PCT/US2015/029740.
Office Action dated Mar. 2, 2017 from Russian Patent Application No. 2016133746 , 7 pages.
Examiner's Report dated May 29, 2017 from Canadian Patent Application No. 2,937,910, 6 pages.
Notice of Preliminary Rejection dated Jun. 14, 2017 from Korean Patent Application No. 10-2016-7022635, 15 pages.
Extended European Search Report dated May 18, 2017 from European Divisional Application No. 16206330.9, 15 pages.
Examination Report dated Jul. 7, 2017 from Australian Patent Application No. 2015256474, 4 pages.
Notice of Preliminary Rejection dated Jul. 18, 2017 from Korean Patent Application No. 10-2016-7027715, 21 pages.
Office Action and Search Report dated Jul. 5, 2017 from Taiwan Divisional Application No. 105137651, 33 pages.
Office Action dated Aug. 1, 2017 from Russian Patent Application No. 201639434, 7 pages.
Examiner's Report dated Jul. 17, 2017 from Canadian Patent Application No. 2,945,065, 7 pages.
Examination Report dated Aug. 21, 2017 from Australian Patent Application No. 2015255871, 8 pages.
Notice of Reasons for Rejection dated Sep. 19, 2017 from Japanese Patent Application No. 2016-549356, 16 pages.
Office Action dated Oct. 17, 2017 from Japanese Patent Application No. 2016-565046, 7 pages.
Extended European Search Report dated Dec. 14, 2017 from European Patent Application No. 15789478.3, 18 pages.
"3GPP, ""Evolved Universal Terrestrial Radio Access (E-UTRA); Radio Resource Control (RRC); Protocol specification (Release 12),""" 3GPP TS 36.331 V12.1.0 (Mar. 2014), Mar. 19, 2014, Lte Advanced, 356 pages".
"3GPP, ""Evolved Universal Terrestrial Radio Access (E-UTRA); Radio Resource Control (RRC); Protocol specification (Release 12),""" 3GPP TS 36.331 V12.3.0 (Sep. 2014), Sep. 23, 2014, Lte Advanced, 221 pages".
3GPP, "Evolved Universal Terrestrial Radio Access (E-UTRA); User Equipment (UE) procedures in idle mode (Release 12)," 3GPP TS 36.304 V12.0.0 (Mar. 2014), Mar. 19, 2014, Lte Advanced, 34 pages.
3GPP, "Evolved Universal Terrestrial Radio Access (E-UTRA); User Equipment (UE) procedures in idle mode (Release 12)," 3GPP TS 36.304 V12.2.0 (Sep. 2014), Sep. 23, 2014, Lte Advanced, 37 pages.
3GPP, "Evolved Universal Terrestrial Radio Access (E-UTRA) and Evolved Universal Terrestrial Radio Access Network (E-UTRAN); Overall description; Stage 2 (Release 12)," 3GPP TS 36.300 V12.1.0 (Mar. 2014), Mar. 19, 2014, Lte Advanced, 209 pages.
3GPP, "Evolved Universal Terrestrial Radio Access (E-UTRA) and Evolved Universal Terrestrial Radio Access Network (E-UTRAN); Overall description; Stage 2 (Release 12)," 3GPP TS 36.300 V12.3.0 (Sep. 2014), Sep. 23, 2014, Lte Advanced, 215 pages.
3GPP, "Study on Wireless Local Area Network (WLAN)—3GPP radio interworking (Release 12)," 3GPP TR 37.834 V12.0.0 (Dec. 2013), Jan. 7, 2014, Ltd Advanced, 17 pages.
3GPP, T"echnical Specification Group Radio Access Network; Study on WLAN/3GPP radio interworking (Release 12)," 3GPP TR 37.834 V1.3.0 (Nov. 2013), Feb. 26, 2014, Lte Advanced, 19 pages.

(56) References Cited

OTHER PUBLICATIONS

LG Electronics, Inc., "Comparison of access network selection solutions," 3GPP TSG RAN2 Meeting #82, R2-132055, Agenda item: 5.1.1, May 20-May 24, 2013, Fukuoka, Japan, 6 pages.
3GPP, "Technical Specification Group Radio Access Network; Study on Wireless Local Area Network (WLAN)—3GPP radio interworking (Release 12)," 3GPP TR 37.834 V12.0.0 (Dec. 2013), Jan. 7, 2014, Lte Advanced, 17 pages.
3GPP, "Technical Specification Group Radio Access Network; UTRAN: General Description; Stage 2 (Release 12)," 3GPP TS 25.300 V0.1.0 (Feb. 2014), Feb. 26, 2014, 5 pages.
3GPP, "Technical Specification Group Radio Access Network; User Equipment (UE) procedures in idle mode and procedures for cell reselection in connected mode (Release 12)," 3GPP TS 25.304 V12.1.0 (Mar. 2014), Mar. 19, 2014, 54 pages.
3GPP, "Technical Specification Group Services and System Aspects; 3GPP System Architecture Evolution (SAE); Security architecture (Release 12)," 3GPP TS 33.401 V12.10.0 (Dec. 2013), Dec. 20, 2013, Lte Advanced, 121 pages.
3GPP, "Technical Specification Group Radio Access Network; Evolved Universal Terrrestial Radio Access (E-UTRA); User Equipment (UE) procedures in idle mode (Release 12)," 3GPP TS 36.304 V12.0.0 (Mar. 2014); Mar. 19, 2014, Lte Advanced; 34 pages.
"3GPP, ""Technical Specification Group Radio Access Network; Radio Resource Control (RRC); Protocol specification (Release 12),"" 3GPP TS 25.331 V12.1.0 (Mar. 2014), Mar. 20, 2014, 2,120 pages".
Intel Corporation, "Stage-2 details of WLAN/3GPP Radio Interworking for LTE," 3GPP TSG-RAN WG2 Meeting #85bis, R2-141617, Current version: 12.1.0, Work item code: UTRA_LTE_WLAN_interw-Core, Mar. 31-Apr. 4, 2014, Valencia, Spain, 8 pages.
Intel Corporation, "Idle mode procedures of WLAN/3GPP Radio Interworking for LTE" 3GPP TSG-RAN WG2 Meeting #85bis, R2-141756, Current version: 12.0.0, Work item code: UTRA_LTE_WLAN_interw-Core, Mar. 31-Apr. 4, 2014, Valencia, Spain, 4 pages.
Intel Corporation, "Connected mode procedures and RRC signaling of WLAN/3GPP Radio Interworking for LTE," 3GPP TSG-RAN WG2 Meeting #86, R2-142136, Current version: 12.1.0, Work item code: UTRA_LTE_WLAN_interw-Core, May 19-May 23, 2014, Seoul, South Korea, 20 pages.
Intel Corporation, "Idle mode procedures of WLAN/3GPP Radio Interworking for LTE," 3GPP TSG-RAN WG2 Meeting #86, R2-142130, Current version: 12.1.0, Work item code: UTRA_LTE_WLAN_interw-Core, May 19-May 23, 2014, Seoul, South Korea, 4 pages.
3GPP, "Technical Specification Group Radio Access Network; Study on WLAN/3GPP radio interworking (Release 12)," 3GPP TR 37.834 V1.3.0 (Nov. 2013), Lte Advanced, 20 pages.
3GPP, "Universal Terrestrial Radio Access Network (UTRAN); General description; Stage 2 (Release 12)," 3GPP TS 25.300 V12.2.0 (Sep. 2014), Sep. 23, 2014, 12 pages.
3GPP, "User Equipment (UE) procedures in idle mode and procedures for cell reselection in connected mode (Release 12)," 3GPP TS 25.304 V12.3.0 (Sep. 2014), Sep. 26, 2014, 58 pages.
3GPP, "Radio Resource Control (RRC); Protocol specification (Release 12)," 3GPP TS 25.331 V12.3.0 (Sep. 2014), Sep. 23, 2014, Sections: 8.1.1.1.2, 8.1.1.623, 8.2.2.3, 8.3.1.12, 8.5.2, 8.6.7.29, 8.6.7.30, 10.1.1, 10.2.8, 10.2.48.8.26, 10.2.62, 10.3.8.18c, 10.3.9b, 10.3.10, 11.2, 11.3, 11.4, 13.1, 13.4.32, 13.4.69, 13.4.70, 13.5.2; pp. 2,204.
Alcatel-Lucent et al., "RAN parameters for traffic steering," 3GPP TSG-RAN WG RAN3#84, R2-134329, Agenda item: 5.1., Nov., 7-11, 2013, San Francisco, USA, 4 pages.
LG Electronics Inc., "Handling of the dedicated RAN assistance information," 3GPP TSG-RAN2 Meeting #85bis, R2-141702, Agenda item: 51.2, Mar. 31-Apr. 4, 2014, Valencia, Spain, 3 pages.
LG Electronics Inc., "Text proposal on WLAN 3GPP radio interworking solution 2," 3GPP TSG-RAN2 Meeting #83, R2-132849, Agenda Item: 5.1, Aug. 19- Aug. 23, 2013, Barcelona, Spain, 4 pages.
Intel et al., "Text Proposal on WLAN/3GPP radio interworking solution 1," 3GPP TSG-RAN2 Meeting #83bis, R2-133698, Agenda item: 5.1, Oct. 7-11, 2013, Ljubljana, Slovenia, 4 pages.
LG Electronics Inc., "Assistance information and signaling procedure," 3GPP TSG-RAN2 Meeting #85, R2-140771, Agenda item: 5.1, Feb. 10-Feb. 14, 2014, Prague, Czech Republic, 4 pages.
Alcatel-Lucent et al., "RAN parameters for traffic steering," 3GPP TSG-RAN WG RAN3#85, R2-140715, Agenda item: 5.1, Feb. 10-14, 2014, Prague, Czech Republic, 6 pages.
Intel, "Introduction of WLAN/3GPP radio interworking functionality into specifications for LTE and UMTS," 3GPP TSG-RAN2 Meeting #85bis, R2-141758, Agenda item: 5.1.2, Mar. 31-Apr. 4, 2014, Valencia, Spain, 10 pages.
Intel, "Proposed way forward on WLAN/3GPP radio interworking," 3GPP TSG-RAN2 Meeting #85, R2-140842, Agenda item: 5.1, Feb. 10-14, 2014, Prague, Czech Republic, 17 pages.
Zte, "Further Consideration on Offloading Evaluation with RAN Assistance Parameters," 3GPP TSG-RAN WG2 Meeting #85bis, R2-141324, Agenda item: 5.1.2, Mar. 31-Apr. 4, 2014, Valencia, Spain, 4 pages.
Intel, "Introduction of WLAN/3GPP radio interworking functionality into specifications for LTE and UMTS," 3GPP TSG-RAN2 Meeting #85bis, R2-141627, Agenda item: 5.1.2, Mar. 31-Apr. 4, 2014, Valencia, Spain, 4 pages.
Alcatel-Lucent et al, "Analysis of Solution 1 ," 3GPP TSG-RAN WG2#82, R2-132018, Agenda Item: 5.1.1, May 20-24, 2013, Fukuoka, Japan, 4 pages.
Mexican Patent Office—Office Action dated Apr. 10, 2018 from Mexican Patent Application No. MX/a/2016/010628, 4 pages.
Canadian Patent Office—Examiner's Report dated May 14, 2018 from Canadian Patent Application No. 2,937,910, 6 pages.
Korean Patent Office—Notice of Preliminary Rejection dated Sep. 3, 2018 from Korean Divisional Application No. 10-2018-7008074, 7 pages.
Japanese Patent Office—Notice of Reasons for Rejection dated Jun. 26, 2018 from Japanese Patent Application No. 2016-565046, 5 pages.

* cited by examiner

SYSTEMS, DEVICES, AND METHODS FOR LONG TERM EVOLUTION AND WIRELESS LOCAL AREA INTERWORKING

CROSS-REFERENCE TO RELATED APPLICATION

This application is a continuation of U.S. patent application Ser. No. 15/260,020, filed Sep. 8, 2016, entitled "SYSTEMS, DEVICES, AND METHODS FOR LONG TERM EVOLUTION AND WIRELESS LOCAL AREA INTERWORKING," which is a continuation of U.S. patent application Ser. No. 14/583,027, filed Dec. 24, 2014, entitled "SYSTEMS, DEVICES, AND METHODS FOR LONG TERM EVOLUTION AND WIRELESS LOCAL AREA INTERWORKING," which claims the benefit of U.S. Provisional Application No. 61/990,694 filed May 8, 2014, entitled "Stage-2 and Stage-3 Details of LTE/WLAN Radio Interworking," and U.S. Provisional Application No. 62/029,936 filed Jul. 28, 2014, entitled "Amendment to WLAN/3GPP Interworking RAN Rules." The entirety of the above-listed applications are hereby incorporated herein by reference.

FIELD

Embodiments of the present disclosure generally relate to the field of wireless communication, and more particularly, to systems, devices, and methods for long-term evolution and wireless local area interworking.

BACKGROUND

Typically, cellular networks need to be able to handoff or offload user equipment (UEs) to wireless local area networks (WLANs). UEs may also need to know how to direct traffic across multiple networks including both radio access network (RANs) and WLANs. An example of a cellular network may include a 3G or 4G network such as those defined by third generation partnership project (3GPP) specifications. An example of a WLAN may include a Wi-Fi network such as those described by the Institute of Electrical and Electronics Engineers (IEEE) 802.11 specifications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the term "or" is used as an inclusive term to mean at least one of the components coupled with the term. For example, the phrase "A or B" means (A), (B), or (A and B); and the phrase "A, B, or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), or memory (shared, dedicated, or group) that execute one or more software or firmware programs, a combinational logic circuit, or other suitable hardware components that provide the described functionality.

Figure 1:
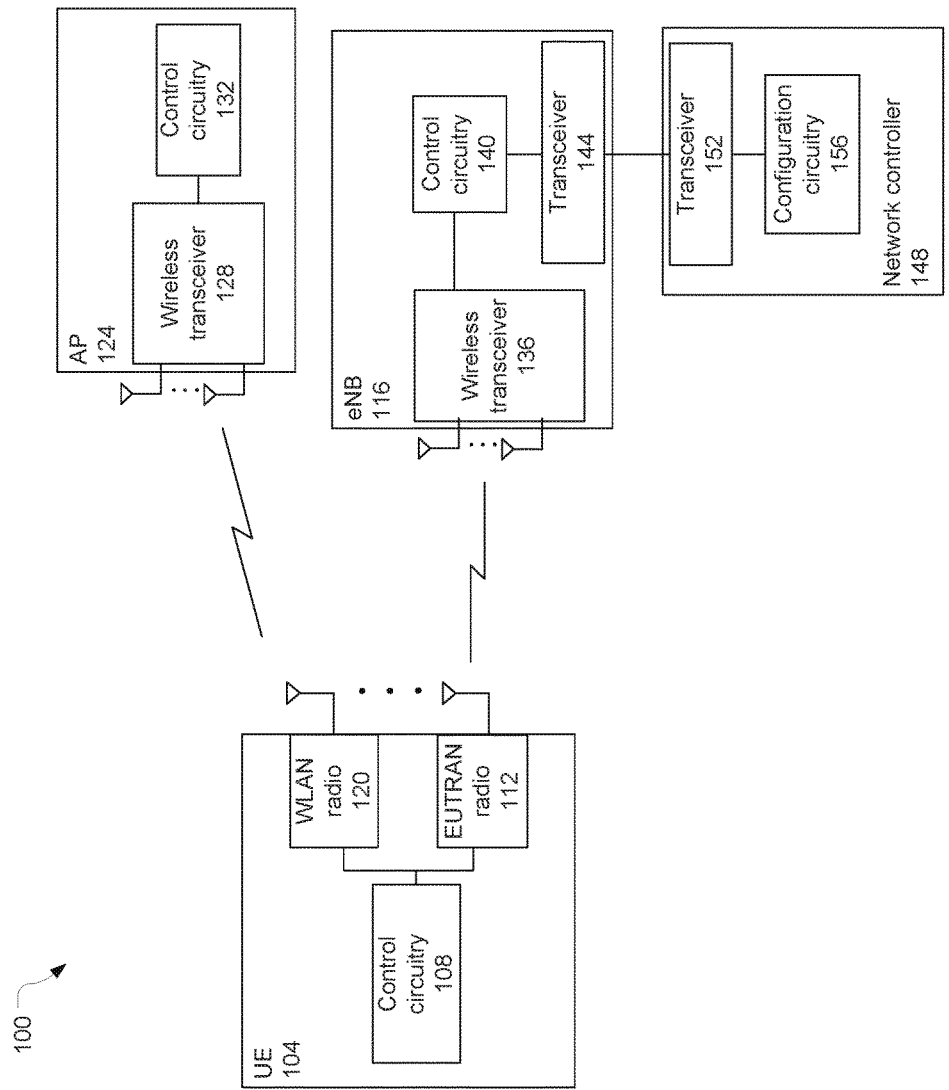
FIG. 1 schematically illustrates a wireless communication environment in accordance with various embodiments.

FIG. 1 schematically illustrates a wireless communication environment 100 in accordance with various embodiments. The environment 100 may include a user equipment (UE) 104 that is capable of communicating over at least two wireless communication networks. The UE 104 may include control circuitry 108 coupled with an evolved universal terrestrial radio access network (EUTRAN) radio 112 that is capable of wireless communication with one or more nodes of a EUTRAN, for example, evolved node B (eNB) 116. The control circuitry 108 may be further coupled with a WLAN radio 120 that is capable of wireless communication with one or more nodes of a WLAN, for example, access point 124.

The AP 124 may include wireless transceiver 128 coupled with control circuitry 132. The control circuitry 132 may control operation and communication of the AP 124. In some embodiments the control circuitry 132 may control communications over the wireless transceiver 128 and one or more additional transceivers, which may be wired or wireless. In some embodiments the control circuitry 132 may be embodied in an access controller that is disposed separately from an access point.

The eNB 116 may also include a wireless transceiver 136 and control circuitry 140. The control circuitry 140 may control operation and communication of the eNB 116. The eNB 116 may be part of a 3rd Generation Partnership Project (3GPP) long-term evolution (LTE) network (or an LTE-Advanced (LTE-A) network) and may include transceiver 144 to communicate with one or more nodes of the LTE/LTE-A network, for example, network controller 148. The eNB 116 may include one or more additional transceivers, which may be wired or wireless.

The network controller 148 may include a transceiver 152 to communicate with the transceiver 144 of the eNB 116. The network controller 148 may further include configuration circuitry 156. In some embodiments, the configuration circuitry 156 may provide radio access network (RAN) assistance parameters to UEs present in a serving cell of the eNB 116, for example, UE 104. The RAN assistance parameters may be provided to the UEs through dedicated or broadcast signaling. The RAN assistance parameters may be used by the UEs, in conjunction with rules with which the UEs are provisioned, to make access network selection and traffic steering decisions as will be described in further detail herein.

The network controller 148 may be part of the EUTRAN along with the eNB 116, another EUTRAN, or an Evolved Packet Core (EPC) that is coupled with the EUTRAN of the eNB 116. As used herein, an EUTRAN of the eNB 116 may refer to a serving cell provided by the eNB 116.

The EPC may include an access network discovery and selection function (ANDSF) to assist UEs to discover non-3GPP access networks that can be used for data communication in addition to 3GPP access networks and provide the UE with rules policing the connection to these networks. The EPC may also provide a communication interface between various RANs and other networks.

While the configuration circuitry 156 is shown in the network controller 148, in other embodiments some or all of the configuration circuitry 156 may be disposed in the eNB 116.

Various embodiments include RAN-assisted UE-based bidirectional traffic steering between EUTRAN and WLAN. For example, a UE 104 may use information provided by components of the EUTRAN, for example, eNB 116, to determine when to steer traffic from the EUTRAN to the WLAN and vice versa. In some embodiments, the UE 104 may steer traffic differently based on whether the UE is in an RRC idle or an RRC connected mode.

The RAN assistance parameters may include EUTRAN signal strength and quality thresholds, WLAN utilization thresholds, WLAN backhaul data rate thresholds, WLAN identifiers (used in access network selection and traffic steering (ANSTS) rules) and offload preference indicator (OPI) (used in ANDSF policies). The UE 104 may use the RAN assistance parameters in the evaluation of ANSTS rules, described herein, to perform traffic steering decisions between EUTRAN and WLAN.

After receiving the RAN assistance parameters, the UE 104 may keep and apply the parameters or discard or ignore the parameters based on various situations and whether the parameters were received through dedicated or broadcast signaling. For example, if the UE 104 is in RRC_CONNECTED, the control circuitry 108 may apply the RAN assistance parameters obtained via dedicated signaling. Otherwise, the UE 104 may apply the RAN assistance parameters obtained via broadcast signaling. If the UE 104 is in RRC_IDLE, it may keep and apply the RAN assistance parameters obtained via dedicated signaling until a cell reselection or handover occurs or a timer has expired since the UE 104 entered RRC_IDLE. After a cell reselection or handover occurs or the timer expires, the UE 104 may apply RAN assistance parameters obtained via broadcast signaling.

In some embodiments, a user of the UE 104 may set preferences with respect to the network with which communication should be conducted. These user-preference settings may take precedent over ANSTS rules.

A user equipment in RRC_CONNECTED or RRC_IDLE that supports traffic steering, shall use the ANSTS unless the UE is provisioned with ANDSF policies by the ANDSF of the EPC. If the UE 104 is provisioned with ANDSF policies, the UE 104 may forward received RAN assistance parameters to upper layers of the UE 104. If the UE 104 is not provisioned with ANDSF policies (or it does not have an active ANDSF policy), it may use received RAN assistance parameters in ANSTS defined in RAN.

When the UE 104 applies ANSTS rules, using received RAN assistance parameters, it may perform traffic steering between the EUTRAN and WLAN with access point name (APN) granularity. For example, when the UE 104 moves the traffic of an evolved packet system (EPS) bearer belonging to an APN between EUTRAN and WLAN it may move the traffic of all the EPS bearers that belong to that APN. The information about which APNs are offloadable to WLAN may be provided by NAS.

In some situations, a EUTRAN may be shared among a number of public land mobile networks (PLMNs). In these situations, each PLMN sharing the EUTRAN may be associated with its own set of RAN assistance parameters. In some embodiments, the eNB 116 may receive or otherwise determine a set of RAN assistance parameters for each PLMN that the eNB 116 serves. The eNB 116 may then deliver these sets of RAN assistance parameters to the UEs in the EUTRAN through broadcast or dedicated signaling.

RAN assistance parameters may be provided to the UE 104 in one or more system information blocks (SIBs) or in an RRC connection reconfiguration message. If any of the RAN assistance parameters are provided in dedicated signaling, for example, in an RRC connection reconfiguration message, the UE 104 may ignore RAN assistance parameters provided in system information, for example, SIBs. In some embodiments, the control circuitry 108 may determine that RAN assistance parameters received via system information are valid only if the UE 104 is camped on a suitable cell.

In some embodiments, the RAN assistance parameters may include identifiers of target WLANs, for example the WLAN associated with the AP 124, to which traffic may be steered. The WLAN identifiers may include service set identifiers (SSIDs), basic service set identifiers (BSSIDs), and/or homogeneous extended service set identifiers (HHIDs). ANSTS rules may be applicable to the target WLANs. In some embodiments, these ANSTS rules may only be applicable if the UE 104 is capable of traffic steering between EUTRAN and WLAN and the UE 104 is not provisioned with active ANDSF policies as described above.

In some respects, the ANSTS rules and the ANDSF policies may be considered two alternative mechanisms that provide similar functionality. Some operators may use ANDSF, while others use ANSTS. Generally speaking, ANDSF may be more comprehensive and, therefore, expensive. Operators that do not need full functionality of ANDSF may prefer to use cheaper ANSTS instead.

Generally, a single operator may only use one mechanism. However, in certain cases, conflicts may happen. For example, when a UE from operator A that uses ANDSF is roaming in a network of operator B that uses ANSTS. In such instances, the mechanism that takes precedent may be explicitly defined.

A first set of the ANSTS rules may describe situations in which traffic may be steered from an EUTRAN to a WLAN. These situations may be based on operational states in the EUTRAN and the WLAN as compared to various thresholds provided in the RAN assistance parameters. In some embodiments, if predefined conditions are met, then an access stratum in the control circuitry 108 may indicate to upper layers of the control circuitry 108, for example, a non-access stratum, when and for which WLAN identifiers (out of a list of WLAN identifiers provided in the RAN access parameters) certain conditions for steering traffic from an EUTRAN to a WLAN are satisfied for a predetermined time interval. The predetermined time interval may be based on a timer value, TsteeringWLAN, which may be a parameter of the RAN assistance parameters.

The conditions for steering traffic to a WLAN may include EUTRAN serving cell conditions and target WLAN conditions. The EUTRAN serving cell conditions may include: Qrxlevmeas<$Thresh_{ServingOffloadWLAN,\ LowP}$; or Qqualmeas<$Thresh_{ServingOffloadWLAN,\ LowQ}$, where Qrxlevmeas may be a measured reference signal received power (RSRP) (in dBM) of the EUTRAN cell, $Thresh_{ServingOffloadWLAN,\ LowP}$ may be an RSRP threshold (in dBM) used by the UE 104 for traffic steering to WLAN, Qqualmeas may be a measured reference signal received quality (RSRQ) (in dB) in the EUTRAN cell, and $Thresh_{ServingOffloadWLAN,\ LowQ}$ may be an RSRQ threshold (in dB) used by the UE 104 for traffic steering to WLAN. Thus, the control circuitry 108 may determine that the EUTRAN serving cell conditions are satisfied if a measured cell receive level value of the EUTRAN is less than the corresponding RSRP threshold or a measured cell quality value of the EUTRAN is less than the corresponding RSRQ threshold.

The target WLAN conditions may include: ChannelUtilizationWLAN<$Thresh_{ChUtilWLAN,\ Low}$; BackhaulRateDlWLAN>$Thresh_{BackhRateDWLAN,\ High}$; BackhaulRateUlWLAN>$Thresh_{BackhRateUlWLAN,\ High}$; and BeaconRSSI>$Thresh_{RSSIWLAN,\ High}$, where ChannelUtilizationWLAN may be a WLAN channel utilization value from basic service set (BSS) load information element (IE) obtained from IEEE 802.11 (Beacon or Probe Response) signaling for an indicated WLAN identifier, $Thresh_{ChUtilWLAN,\ Low}$ may be a WLAN channel utilization (BSS load) threshold used by the UE 104 for traffic steering to WLAN, BackhaulRateDlWLAN may be a backhaul available downlink bandwidth that may be calculated as Downlink Speed*(1−Downlink Load/255), where the Downlink Speed and Downlink Load parameters may be drawn from wide area network (WAN) Metrics element obtained via access network query protocol (ANQP) signaling from Wi-Fi Alliance (WFA) hotspot (HS) 2.0 (based on IEEE 802.11u and WFA extensions), $Thresh_{BackhRateDlWLAN,\ High}$ may be a backhaul available downlink bandwidth threshold used by the UE 104 for traffic steering to WLAN, BackhaulRateUlWLAN may be a backhaul available uplink bandwidth that may be calculated as Uplink Speed*(1−Uplink Load/255), where the Uplink Speed and Uplink Load parameters may be drawn from the WAN metrics element obtained via ANQP signaling from WFA HS2.0, $Thresh_{BackhRateUlWLAN,\ High}$ may be a backhaul available uplink bandwidth threshold used by the UE 104 for traffic steering to WLAN, BeaconRSSI may be an RSSI as measured by the UE 104 on the WLAN Beacon, and $Thresh_{RSSIWLAN,\ High}$ may be a Beacon RSSI threshold used by the UE 104 for traffic steering to WLAN. Thus, the control circuitry 108 may determine that the WLAN conditions are satisfied if a WLAN channel utilization is less than the corresponding WLAN channel utilization threshold, a WLAN downlink backhaul rate is greater than a corresponding WLAN downlink backhaul rate threshold, a WLAN uplink backhaul rate is greater than a corresponding WLAN uplink backhaul rate threshold, and a beacon RSSI is greater than a corresponding WLAN beacon RSSI threshold.

In some embodiments, the UE 104 may receive only a subset of thresholds discussed herein. In such embodiments, the UE 104 may exclude the evaluation of a measurement for which a corresponding threshold has not been provided.

In an embodiment in which more than one target WLAN meets the conditions above, it may be up to the UE 104 to choose one of the available target WLANs. In some embodiments, each of the target WLANs may have an associated priority by which the UE 104 selects the WLAN with which to associate. The associated priority may be transmitted with the WLAN identifiers in the RAN assistance parameters.

A second set of the ANSTS rules may describe situations in which traffic may be steered from a WLAN to an EUTRAN cell. Similar to the above discussion, these situations may be based on operational states in the WLAN and EUTRAN cell as compared to various thresholds provided in the RAN assistance parameters. In some embodiments, if predefined conditions are met, then an access stratum in the control circuitry 108 may indicate to upper layers of the control circuitry 108, for example, a non-access stratum, when certain conditions for steering traffic from a WLAN to an EUTRAN cell are satisfied for a predetermined time interval, TsteeringWLAN.

The WLAN conditions for steering traffic to a target EUTRAN cell from the WLAN may include: ChannelUtilizationWLAN>$Thresh_{ChUtilWLAN,\ High}$; BackhaulRateDlWLAN<$Thresh_{BackhRateDlWLAN,\ Low}$; BackhaulRateUlWLAN<$Thresh_{BackhRateUlWLAN,\ Low}$; or BeaconRSSI<$Thresh_{RSSIWLAN,\ Low}$, where $Thresh_{ChUtilWLAN,High}$ may be a WLAN channel utilization (BSS load) threshold used by the UE 104 for traffic steering to EUTRAN, $Thresh_{BackhRateDlWLAN,\ Low}$ may be a backhaul available downlink bandwidth threshold used by the UE 104 for traffic steering to EUTRAN, $Thresh_{BackhRateUlWLAN,\ Low}$ may be a backhaul available uplink bandwidth threshold used by the UE 104 for traffic steering to EUTRAN, and $Thresh_{RSSIWLAN,\ Low}$ may be a Beacon RSSI threshold used by the UE 104 for traffic steering to EUTRAN. Thus, the control circuitry 108 may determine the WLAN conditions for steering traffic to the target EUTRAN cell are satisfied if a WLAN channel utilization is greater than a corresponding WLAN channel utilization threshold, a WLAN downlink backhaul rate is less than a corresponding WLAN downlink backhaul rate threshold, a WLAN uplink backhaul rate is less than a corresponding WLAN uplink backhaul rate threshold, or a beacon RSSI is less than a corresponding WLAN beacon RSSI threshold.

The EUTRAN conditions for steering traffic to a target EUTRAN cell from a WLAN may include: Qrxlevmeas>$Thresh_{ServingOffloadWLAN,HighP}$; and Qqualmeas>$Thresh_{ServingOffloadWLAN,\ HighQ}$, where $Thresh_{ServingOffloadWLAN,\ HighP}$ may be an RSRP threshold (in dBM) used by the UE 104 for traffic steering to EUTRAN and $Thresh_{ServingOffloadWLAN,\ HighQ}$ may be an RSRQ threshold (in dB) used by the UE 104 for traffic steering to EUTRAN. Thus, the control circuitry 108 may determine the EUTRAN conditions for steering traffic to the target EUTRAN cell are satisfied if a measured cell receive level value of the EUTRAN is greater than a corresponding RSRP threshold and a measured cell quality value of the EUTRAN is greater than a corresponding RSRQ threshold.

As can be seen in the above, and in Table 1 below, the RAN assistance parameters may include first EUTRAN/WLAN thresholds for steering traffic from an EUTRAN to the WLAN and second EUTRAN/WLAN thresholds for steering traffic from a WLAN to an EUTRAN. The different thresholds may be separated by a sufficient degree to prevent ping-ponging between EUTRAN and WLAN. Thus, the high and low thresholds may define an acceptable operating range in which traffic steering may not be employed.

the EUTRAN to the UE 104 over a broadcast control channel (BCCH) logical channel and may have a transparent mode (TM) radio link control (RLC)-service access point (SAP).

In some embodiments, the SystemInformation message may have an abstract syntax notation (ASN) as follows.

```
--ASN1START
SystemInformation ::=                    SEQUENCE {
        criticalExtensions                       CHOICE {
            systemInformation-r8         SystemInformation-r8-IEs,
            criticalExtensionsFuture     SEQUENCE { }
        }
}
SystemInformation-r8-IEs ::=             SEQUENCE {
        sib-TypeAndInfo                          SEQUENCE (SIZE (1..maxSIB)) OF CHOICE {
            sib2                          SystemInformationBlockType2,
            sib3                          SystemInformationBlockType3,
            sib4                          SystemInformationBlockType4,
            sib5                          SystemInformationBlockType5,
            sib6                          SystemInformationBlockType6,
            sib7                          SystemInformationBlockType7,
            sib8                          SystemInformationBlockType8,
            sib9                          SystemInformationBlockType9,
            sib10                         SystemInformationBlockType10,
            sib11                         SystemInformationBlockType11,
            ...,
            sib12-v920                    SystemInformationBlockType12-r9
            sib13-v920                    SystemInformationBlockType13-r9
            sib14-v1130                   SystemInformationBlockType14-r11
            sib15-v1130                   SystemInformationBlockType15-r11
            sib16-v1130                   SystemInformationBlockType16-r11
            sib17-v12xy                   SystemInformationBlockType17-r12
            sib18-v12xy                   SystemInformationBlockType18-r12
        },
        nonCriticalExtension                     SystemInformation-v8a0-IEs
            OPTIONAL          -- Need OP
}
SystemInformation-v8a0-IEs ::= SEQUENCE {
        lateNonCriticalExtension                 OCTET STRING
            OPTIONAL,         -- Need OP
        nonCriticalExtension                     SEQUENCE { }
            OPTIONAL          -- Need OP
}
-- ASN1STOP
```

In some embodiments, if upper layers of the control circuitry 108 receive an indication provided by an access stratum of the control circuitry 108 that contradicts with user preferences or if the UE 104 has an active ANDSF policy, the upper layers may ignore the indication and may not engage in traffic steering.

As discussed above, in some embodiments, the RAN assistance parameters be transmitted in a SystemInformation message. The SystemInformation message may be used to convey one or more system information blocks (SIBs). The included SIBs may be transmitted with the same periodicity. The SystemInformation message may be transmitted from The above ASN of the SystemInformation message system includes information for system information block types 17 and 18, which may include the RAN assistance parameters in some embodiments. In one example, the various thresholds of the RAN assistance parameters may be included in SystemInformationBlockType17 and the list of target WLAN identifiers may be included in SystemInformationBlockType18.

SystemInformationBlockType17 information element may have an ANS format as indicated below in accordance with some embodiments.

```
-- ASN1START
SystemInformationBlockType17-r12 ::=    SEQUENCE {
    wlanOffloadParam-r12                CHOICE {
    wlanOffload-Common-r12              WlanOffload-Param-r12,
    wlanOffload-PerPLMN-List-r12        SEQUENCE (SIZE (1..maxPLMN-r11)) OF
        WlanOffload-ParamPerPLMN-r12
    }                                   OPTIONAL,
    ...,
    lateNonCriticalExtension            OCTET STRING        OPTIONAL
}
WlanOffload-ParamPerPLMN-r12 ::=                    SEQUENCE {
    ran-Param-r12           WlanOffload-Param-r12           OPTIONAL
}
WlanOffload-Param-r12 ::=                                   SEQUENCE {
    thresholdRSRP-Low-r12                   RSRP-Range          OPTIONAL,
    thresholdRSRP-High-r12                  RSRP-Range          OPTIONAL,
    thresholdRSRQ-Low-r12                   RSRQ-Range          OPTIONAL,
    thresholdRSRQ-High-r12                  RSRQ-Range          OPTIONAL,
    thresholdRSSI-Low-r12                   RSSI-Range          OPTIONAL,
    thresholdRSSI-High-r12                  RSSI-Range          OPTIONAL,
    thresholdChannelUtilization-Low-r12     INTEGER (1...255)   OPTIONAL,
    thresholdChannelUtilization-High-r12    INTEGER (1...255)   OPTIONAL,
    thresholdBackhaulDLBandwidth-Low-r12    INTEGER (1...4194304)   OPTIONAL,
    thresholdBackhaulDLBandwidth-High-r12   INTEGER (1...4194304)   OPTIONAL,
    thresholdBackhaulULBandwidth-Low-r12    INTEGER (1...4194304)   OPTIONAL,
    thresholdBackhaulULBandwidth-High-r12   INTEGER (1...4194304)   OPTIONAL,
    offloadPreferenceIndicator-r12          BIT STRING (SIZE (2))   OPTIONAL,
    t-SteeringWLAN-r12                      T-Reselection           OPTIONAL,
    ...
}
-- ASN1STOP
```

The field descriptions of the SystemInformationBlock-Type17 are described in Table 1.

TABLE 1

SystemInformationBlockType17 field descriptions wlanOffloadParam
The RAN assistance parameters for traffic steering between E-UTRAN and WLAN.
wlanOffload-Common
The RAN assistance parameters for traffic steering between E-UTRAN and WLAN applicable for all PLMN(s).
wlanOffload-PerPMN-List
The RAN assistance parameters for traffic steering between E-UTRAN and WLAN per PLMN, listed in the same order as the PLMN(s) occur in plmn-IdentityList in SystemInformationBlockType1.
thresholdRSRP-Low
Indicates the RSRP threshold (in dBm) used by the UE for traffic steering to WLAN. Parameter: $Thresh_{ServingOffloadWLAN, LowP}$ used in ANSTS rules described herein.
thresholdRSRP-High
Indicates the RSRP threshold (in dBm) used by the UE for traffic steering to E-UTRAN. Parameter: $Thresh_{ServingOffloadWLAN, HighP}$ used in ANSTS rules described herein.
thresholdRSRQ-Low
Indicates the RSRQ threshold (in dB) used by the UE for traffic steering to WLAN. Parameter: $Thresh_{ServingOffloadWLAN, LowQ}$ used in ANSTS rules described herein.
thresholdRSRQ-High
Indicates the RSRQ threshold (in dB) used by the UE for traffic steering to E-UTRAN. Parameter: $Thresh_{ServingOffloadWLAN, HighQ}$ used in ANSTS rules described herein.
thresholdRSSI-Low
Indicates the Beacon RSSI threshold used by the UE for traffic steering to E-UTRAN. Parameter: $Thresh_{RSSIWLAN, Low}$ used in ANSTS rules described herein.
thresholdRSSI-High
Indicates the Beacon RSSI threshold used by the UE for traffic steering to WLAN. Parameter: $Thresh_{RSSIWLAN, High}$ used in ANSTS rules described herein.
thresholdChannelUtilization-Low
Indicates the WLAN channel utilization (BSS load) threshold used by the UE for traffic steering to WLAN. Parameter: $Thresh_{ChUtilWLAN, Low}$ used in ANSTS rules described herein.
thresholdChannelUtilization-High TABLE 1-continued SystemInformationBlockType17 field descriptions Indicates the WLAN channel utilization (BSS load) threshold used by the UE for traffic steering to E-UTRAN. Parameter: $Thresh_{ChUtilWLAN, High}$ used in ANSTS rules described herein.
thresholdBackhaulDLBandwidth-Low
Indicates the backhaul available downlink bandwidth threshold used by the UE for traffic steering to E-UTRAN. Parameter: $Thresh_{BackhRateDLWLAN, Low}$ used in ANSTS rules described herein.
Value in kilobits/second.
thresholdBackhaulDLBandwidth-High
Indicates the backhaul available downlink bandwidth threshold used by the UE for traffic steering to WLAN. Parameter: $Thresh_{BackhRateDLWLAN, High}$ used in ANSTS rules described herein.
Value in kilobits/second.
thresholdBackhaulULBandwidth-Low
Indicates the backhaul available uplink bandwidth threshold used by the UE for traffic steering to E-UTRAN. Parameter: $Thresh_{BackhRateULWLAN, Low}$ used in ANSTS rules described herein.
Value in kilobits/second.
thresholdBackhaulULBandwidth-High
Indicates the backhaul available uplink bandwidth threshold used by the UE for traffic steering to WLAN. Parameter: $Thresh_{BackhRateULWLAN, High}$ used in ANSTS rules described herein.
Value in kilobits/second.
offloadPreferenceIndicator
Indicates the Offload preference indicator.
t-SteeringWLAN
Indicates the timer value during which the rules should be fulfilled before starting traffic steering between E-UTRAN and WLAN. Parameter: $Tsteering_{WLAN}$ used in ANSTS rules described herein.

In some embodiments, if the UE 104 has been provisioned with ANDSF policies as defined in 3GPP TS 24.312 v 12.4.0 (Mar. 17, 2014), then upon receiving the RAN assistance parameters in the SystemInformationBlockType17, the lower layers of the UE 104 may provide the RAN assistance parameters for access network selection and traffic steering between EUTRAN and WLAN to the upper layers of the UE 104.

SystemInformationBlockType18 information element may have an ANS format as indicated below in accordance with some embodiments.

```
-- ASN1START
SystemInformationBlockType18-r12 ::=          SEQUENCE {
        wlanIdentifiersListPerPLMN-r12
        WlanIdentifiersListPerPLMN-r12                       OPTIONAL,
        ...,
        lateNonCriticalExtension              OCTET STRING
        OPTIONAL
}
WlanIdentifiersListPerPLMN-r12 ::=SEQUENCE (SIZE (1..maxPLMN-r11)) OF WlanIdentifiersList-r12
WlanIdentifiersList-r12 ::= SEQUENCE (SIZE (1..maxWLANId-r12)) OF WlanIdentifier-r12
WlanIdentifier-r12 ::= OCTET STRING (SIZE (FFS))
-- ASN1STOP
```

The wlanIdentifiersListPerPLMN may be a list of WLAN identifiers for WLAN access network selection per PLMN, listed in the same order that the PLMNs occur in plmn-IdentityList in SystemInformationBlockType1. The list of WLAN identifiers may indicate which WLANs the UE 104 may connect to if it is not provisioned with ANDSF policies.

In some embodiments changes to SIB types in addition to the SIBTypes that actually carry the RAN assistance parameters may be instituted to account for the RAN assistance parameters. For example, a SystemInformationBlockType1 Message may be updated to include an ASN as follows.

```
-- ASN1START
SystemInformationBlockType1 ::=       SEQUENCE {
        cellAccessRelatedInfo         SEQUENCE {
                plmn-IdentityList             PLMN-IdentityList,
                trackingAreaCode              TrackingAreaCode,
                cellIdentity                  CellIdentity,
                cellBarred                    ENUMERATED {barred, notBarred},
                intraFreqReselection          ENUMERATED {allowed, notAllowed},
                csg-Indication                BOOLEAN,
                csg-Identity                  CSG-Identity      OPTIONAL -- Need OR
        },
        cellSelectionInfo             SEQUENCE {
                q-RxLevMin                    Q-RxLevMin,
                q-RxLevMinOffset              INTEGER (1..8) OPTIONAL          --
Need OP
        },
        p-Max                         P-Max      OPTIONAL,             -- Need OP
                freqBandIndicator             FreqBandIndicator,
                schedulingInfoList            SchedulingInfoList,
                tdd-Config                    TDD-Config        OPTIONAL,     -- Cond TDD
                si-WindowLength               ENUMERATED {
                                                ms1, ms2, ms5, ms10, ms15, ms20,
                                                ms40},
                systemInfoValueTag            INTEGER (0..31),
                nonCriticalExtension          SystemInformationBlockType1-v890-IEs
                        OPTIONAL    -- Need OP
}
SystemInformationBlockType1-v890-IEs::= SEQUENCE {
        lateNonCriticalExtension      OCTET STRING (CONTAINING
                SystemInformationBlockType1-v8h0-IEs)                OPTIONAL, --
                Need OP
        nonCriticalExtension  SystemInformationBlockType1-v920-IEs   OPTIONAL --
Need OP
}
-- Late non critical extensions
SystemInformationBlockType1-v8h0-IEs ::=             SEQUENCE {
        multiBandInfoList             MultiBandInfoList           OPTIONAL, -- Need OR
        nonCriticalExtension          SystemInformationBlockType1-v9e0-IEs       OPTIONAL
                -- Need OP
}
SystemInformationBlockType1-v9e0-IEs ::= SEQUENCE {
        freqBandIndicator-v9e0        FreqBandIndicator-v9e0 OPTIONAL, -- Cond FBI-max
        multiBandInfoList-v9e0        MultiBandInfoList-v9e0   OPTIONAL, -- Cond mFBI-
max
        nonCriticalExtension          SEQUENCE { }               OPTIONAL   -- Need OP
}
-- Regular non critical extensions
SystemInformationBlockType1-v920-IEs ::=             SEQUENCE {
        ims-EmergencySupport-r9       ENUMERATED {true}         OPTIONAL, -- Need OR
        cellSelectionInfo-v920        CellSelectionInfo-v920    OPTIONAL, -- Cond RSRQ
        nonCriticalExtension          SystemInformationBlockType1-v1130-IEs     OPTIONAL
                -- Need OP
}
```

```
SystemInformationBlockType1-v1130-IEs ::=    SEQUENCE {
    tdd-Config-v1130      TDD-Config-v1130    OPTIONAL, -- Cond TDD-OR
    cellSelectionInfo-v1130    CellSelectionInfo-v1130 OPTIONAL, -- Cond WB-
RSRQ
    nonCriticalExtension       SEQUENCE { }          OPTIONAL    -- Need OP
}
PLMN-IdentityList ::=      SEQUENCE (SIZE (1..maxPLMN-r11)) OF PLMN-IdentityInfo
PLMN-IdentityInfo ::=      SEQUENCE {
    plmn-Identity              PLMN-Identity,
    cellReservedForOperatorUse ENUMERATED {reserved, notReserved}
}
SchedulingInfoList ::= SEQUENCE (SIZE (1..maxSI-Message)) OF SchedulingInfo
SchedulingInfo ::=     SEQUENCE {
    si-Periodicity             ENUMERATED {
                               rf8, rf16, rf32, rf64, rf128, rf256, rf512},
    sib-MappingInfo            SIB-MappingInfo
}
SIB-MappingInfo ::= SEQUENCE (SIZE (0..maxSIB-1)) OF SIB-Type
SIB-Type ::=        ENUMERATED {
                               sibType3, sibType4, sibType5, sibType6,
                               sibType7, sibType8, sibType9, sibType10,
                               sibType11, sibType12-v920, sibType13-v920,
                               sibType14-v1130, sibType15-v1130,
                               sibType16-v1130, sibType17-v12xy, sibType18-v12xy, ...}
CellSelectionInfo-v920 ::=         SEQUENCE {
    q-QualMin-r9                    Q-QualMin-r9,
    q-QualMinOffset-r9              INTEGER (1..8)       OPTIONAL    -- Need OP
}
CellSelectionInfo-v1130 ::=        SEQUENCE {
    q-QualMinWB-r11                    Q-QualMin-r9
}
-- ASN1STOP
```

As can be seen, SIB-Type may include SIB-type 17 and 18, which may carry the RAN assistance parameters as described above.

The field descriptions of SystemInformationBlockType1 may be in accordance with 3GPP TS 36.331 v. 12.1.0 (Mar. 19, 2014).

In some embodiments, the system information containing the RAN access parameters may be referred to as "required" system information of which the UE 104, if in RRC_CONNECTED, should ensure having a valid version.

In some embodiments, the RAN access parameters may be provided in dedicated signaling such as an RRCConnectionReconfiguration message. The RRCConnectionReconfiguration message may be the command to modify an RRC connection. It may convey information for measurement configuration, mobility control, radio resource configuration (including radio bearers, MAC Main configuration and physical channel configuration) including any associated dedicated NAS information security configuration. The RRCConnectionReconfiguration message may be transmitted to the UE 104 on signal radio bearer 1 (SRB1) in the downlink control channel (DCCH) and may have an acknowledged mode (AM) RLC-SAP. In some embodiments, the RRCConnectionReconfiguration message may have an ASN as shown below.

```
--ASN1START
RRCConnectionReconfiguration ::= SEQUENCE {
    rrc-TransactionIdentifier           RRC-TransactionIdentifier,
    criticalExtensions                  CHOICE {
        c1
        CHOICE{
                                rrcConnectionReconfiguration-r8
        RRCConnectionReconfiguration-r8-IEs,
                            spare7 NULL
                            spare6 NULL, spare5 NULL, spare4 NULL,
                            spare3 NULL, spare2 NULL, spare1 NULL
        },
        criticalExtensionsFuture            SEQUENCE { }
    }
}
RRConnectionReconfiguration-r8-IEs ::= SEQUENCE {
    measConfig              MeasConfig          OPTIONAL, --Need ON
    mobilityControlInfo     MobilityControlInfo OPTIONAL, --Cond HO
    dedicatedInfoNASList            SEQUENCE (SIZE(1...maxDRB)) OF
    DedicatedInfoNAS                OPTIONAL, --Cond nonHO
    radioResourceConfigDedicated    RadioResrouceConfigDedicated OPTIONAL, --
Cond HO-toEUTRA
    securityConfigHO                SecurityConfigHO
                    OPTIONAL,  -- Cond HO
    nonCriticalExtension                RRCConnectionReconfiguration-
    v890-IEs    OPTIONAL  -- Need OP
}
```

```
RRCConnectionReconfiguration-v890-IEs ::= SEQUENCE {
    lateNonCriticalExtension           OCTET STRING
        OPTIONAL,         -- Need OP
    nonCriticalExtension               RRCConnectionReconfiguration-
v920-IEs    OPTIONAL      -- Need OP
}
RRCConnectionReconfiguration-v920-IEs ::= SEQUENCE {
    otherConfig-r9                     otherConfig-r9
        OPTIONAL,         -- Need ON
    fullConfig-r9
        OPTIONAL,         -- Cond HO-Reestab
    nonCriticalExtension               RRCConnectionReconfiguration
v1020-IEs   OPTIONAL      -- Need OP
}
RRCConnectionReconfiguration-v1020-IEs ::= SEQUENCE {
    sCellToReleaseList-r10             SCellToReleaseList-r10
        OPTIONAL,         -- Need ON
    sCellToAddModList-r10              SCellToAddModList-r10
        OPTIONAL,         -- Need ON
    nonCriticalExtension               RRCConnectionReconfiguration-
V1130-IEs   OPTIONAL   -- Need OP
}
RRCConnectionReconfiguration-v1130-IEs ::= SEQUENCE {
    systeminformationBlockType1Dedicated-r11   OCTET STRING (CONTAINING
SystemInformationBlockType1)
        OPTIONAL,  -- Need ON
    nonCriticalExtension               RRCConnectionReconfiguration-
v12xy-IEs                              OPTIONAL   -- Need OP
}
RRCConnectionReconfiguration-v12xy-IEs ::= SEQUENCE {
    wlanOffloadParamDedicated-r12
    wlanOffloadParamDedicated-12                      OPTIONAL,
    nonCriticalExtension               SEQUENCE { }
        OPTIONAL   -- Need OP
}
SCellToAddModList-r10 ::=      SEQUENCE (SIZE(1..maxSCell-r10)) OF
SCellToAddMod-r10
SCellToAddMod-r10 ::=          SEQUENCE {
    sCellIndex-r10                     SCellIndex-r10,
    cellIdentification-r10             SEQUENCE {
        physCellId-r10                         PhysCellId,
        dl-CarrierFreq-r10                     ARFCN-ValueEUTRA
    }
                    OPTIONAL,  -- Cond SCellAdd
    radioResourceConfigCommonSCell-r10    RadioResourceConfigCommonSCell-
r10    OPTIONAL,  -- Cond SCellAdd
    radioResourceConfigDedicatedSCell-r10    RadioResourceConfigDedicatedSCell-r10
        OPTIONAL,  -- Cond SCellAdd2
        ...,
    [[  dl-CarrierFreq-v1090           ARFCN-ValueEUTRA-v9e0 OPTIONAL
    -- Cond EARFCN-max
    ]]
}
SCellToReleaseList-r10 ::=         SEQUENCE (SIZE (1..maxSCell-r10)) OF
SCellIndex-r10
SecurityConfigHO ::=               SEQUENCE {
    handoverType                           CHOICE {
        intraLTE                                   SEQUENCE {
            securityAlgorithmConfig
        SecurityAlgorithmConfig    OPTIONAL,  -- Cond fullConfig
            keyChangeIndicator                 BOOLEAN,
            nextHopChainingCount
        NextHopChainingCount
        },
        interRAT                                   SEQUENCE {
            securityAlgorithmConfig
        SecurityAlgorithmConfig,
            nas-SecurityParamToEUTRA       OCTET STRING (SIZE(6))
        }
    },
    ...
}
-- ASN1STOP
```

The field descriptions of the RRCConnectionReconfiguration message are described in Table 2a and the conditional terms are described in Table 2b.

TABLE 2a

RRCConnectionReconfiguration field descriptions dedicatedInfoNASList
This field is used to transfer UE specific NAS layer information between the network and the UE. The RRC layer is transparent for each PDU in the list.
fullConfig
Indicates the full configuration option is applicable for the RRC Connection Reconfiguration message.
keyChangeIndicator TABLE 2a-continued RRCConnectionReconfiguration field descriptions true is used only in an intra-cell handover when a $K_{eNB}$ key is derived from a $K_{ASME}$ key taken into use through the latest successful NAS SMC procedure, as described in 3GPP TS 33.401 v.12.10.0 (Dec. 20, 2013) for $K_{eNB}$ re-keying. false is used in an intra-LTE handover when the new $K_{eNB}$ key is obtained from the current $K_{eNB}$ key or from the NH as described in TS 33.401.
nas-securityParamToEUTRA
This field is used to transfer UE specific NAS layer information between the network and the UE. The RRC layer is transparent for this field, although it affects activation of AS- security after inter-RAT handover to E-UTRA. The content is defined in TS 24.301, v12.4.0 (Mar. 17, 2014)
nextHopChainingCount
Parameter NCC: See TS 33.401.

TABLE 2b

| Conditional presence | Explanation |
| --- | --- |
| EARFCN-max | The field is mandatory present if dl-CarrierFreq-r10 is included and set to maxEARFCN. Otherwise the field is not present. |
| fullConfig | This field is mandatory present for handover within E-UTRA when the fullConfig is included; otherwise it is optionally present, Need OP. |
| HO | The field is mandatory present in case of handover within E-UTRA or to E-UTRA; otherwise the field is not present. |
| HO-Reestab | This field is optionally present, need ON, in case of handover within E-UTRA or upon the first reconfiguration after RRC connection re-establishment; otherwise the field is not present. |
| HO-toEUTRA | The field is mandatory present in case of handover to E-UTRA or for reconfigurations when fullConfig is included; otherwise the field is optionally present, need ON. |
| nonHO | The field is not present in case of handover within E-UTRA or to E-UTRA; otherwise it is optional present, need ON. |

TABLE 2b-continued

| Conditional presence | Explanation |
| --- | --- |
| SCellAdd | The field is mandatory present upon SCell addition; otherwise it is not present. |
| SCellAdd2 | The field is mandatory present upon SCell addition; otherwise it is optionally present, need ON. |

The WlanOffloadParamDedicated information element of the RRCConnectionReconfiguration message may contain information relevant for traffic steering between EUTRAN and WLAN. The WlanOffloadParamDedicated may have an ANS format as indicated below in accordance with some embodiments.

```
-- ASN1START
WlanOffloadParamDedicated-r12 ::=SEQUENCE {
    wlanOffload-Param-r12      WlanOffload-Param-r12        OPTIONAL,
        -- Need ON
    wlanIdentifiersList-r12    WlanIdentifiersList-r12      OPTIONAL,
        -- Need ON
    t3350                                                   ENUMERATED {
                                                               FFS}  OPTIONAL,
        -- Need OR
    ...
}
-- ASN1STOP
``` t350 may be a validity time for RAN assistance parameters. The UE 104 may start a validity timer, T350, upon the UE 104 entering RRC_IDLE with the validity time t350 received for RAN assistance parameters. If the UE 104 engages in cell reselection or handover, it may stop the validity timer. If the validity timer expires, the UE 104 may discard the RAN assistance parameters provided by dedicated signaling.

Figure 2:
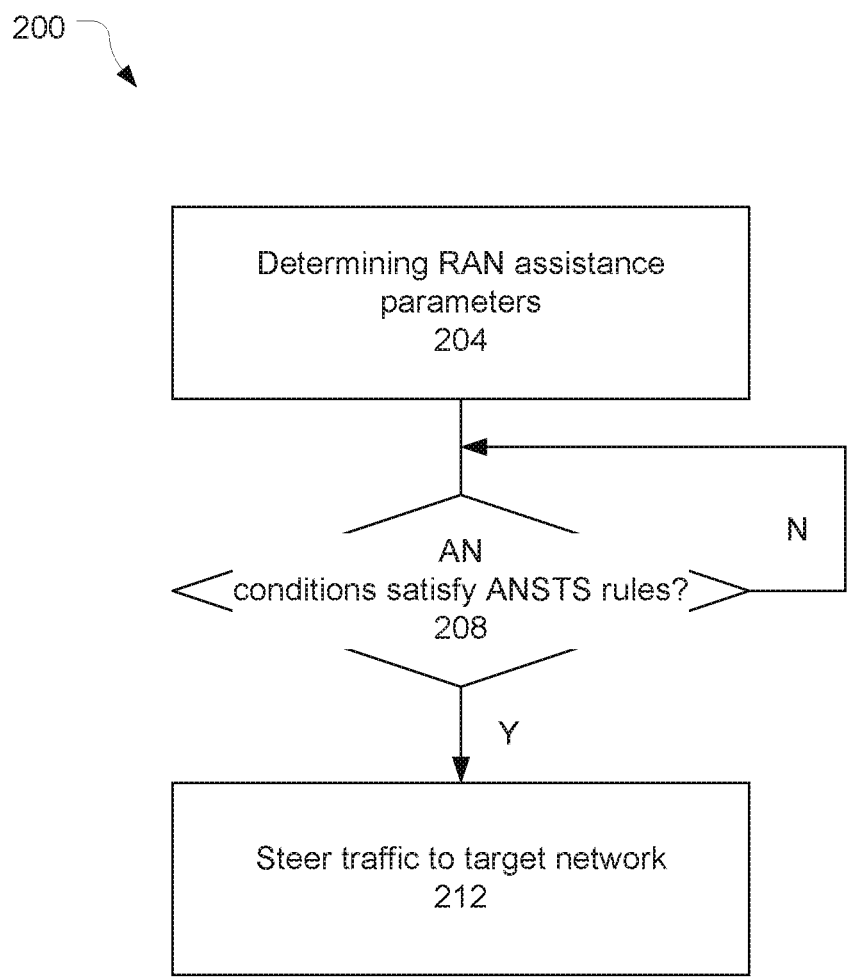
FIG. 2 is flowchart of an access network selection and traffic steering operation of a user equipment in accordance with some embodiments.

FIG. 2 is a flowchart depicting a traffic steering operation 200 of a user equipment, for example, UE 104, in accordance with some embodiments. In some embodiments, the UE 104 may include circuitry to perform the traffic-steering operation 200. For example, the UE 104 may include one or more non-transitory computer-readable media having instructions that, when executed, cause the UE to perform the traffic-steering operation 200. Dedicated circuitry may additionally/alternatively be used to perform one or more aspects of the traffic-steering operation 200.

The traffic steering operation 200 may include, at 204, the UE 104 determining RAN assistance parameters. In some embodiments, the UE 104 may determine the RAN assistance parameters by processing messages received from the configuration circuitry 156, which may be in the network controller 148 or the eNB 116. In embodiments in which the configuration circuitry 156 is located in the network controller 148, the RAN assistance parameters may be provided to the UE 104 through the eNB 116. The RAN assistance parameters may be provided to the UE 104 from the eNB 116 through dedicated or broadcast signaling.

The traffic steering operation may include, at 208, the UE 104 determining whether conditions of the access networks (ANs), for example, the EUTRAN and the WLAN, satisfy ANSTS rules for a predetermined period of time. The determination at 208 may be based on the RAN assistance parameters received at 204. The UE 104 may set a timer with a value, for example, TSteeringWLAN, and may monitor the conditions until expiration of the timer.

The conditions of the ANs may be determined by direct measurement, from reports from nodes of the ANs, for example, AP 124 or eNB 116, or a combination of the two.

If, at 208, the UE determines the ANs satisfy the predetermined conditions for the predetermined period of time, the UE may steer traffic to the appropriate access network at 212. In some embodiments, the access stratum of the control circuitry 108 may monitor the conditions and notify a non-access stratum of the control circuitry 108 of the satisfaction of the conditions. At such time, the non-access stratum may initiate transfer of traffic, for example, all EPS bearers of a particular APN, to the targeted access node.

Figure 3:
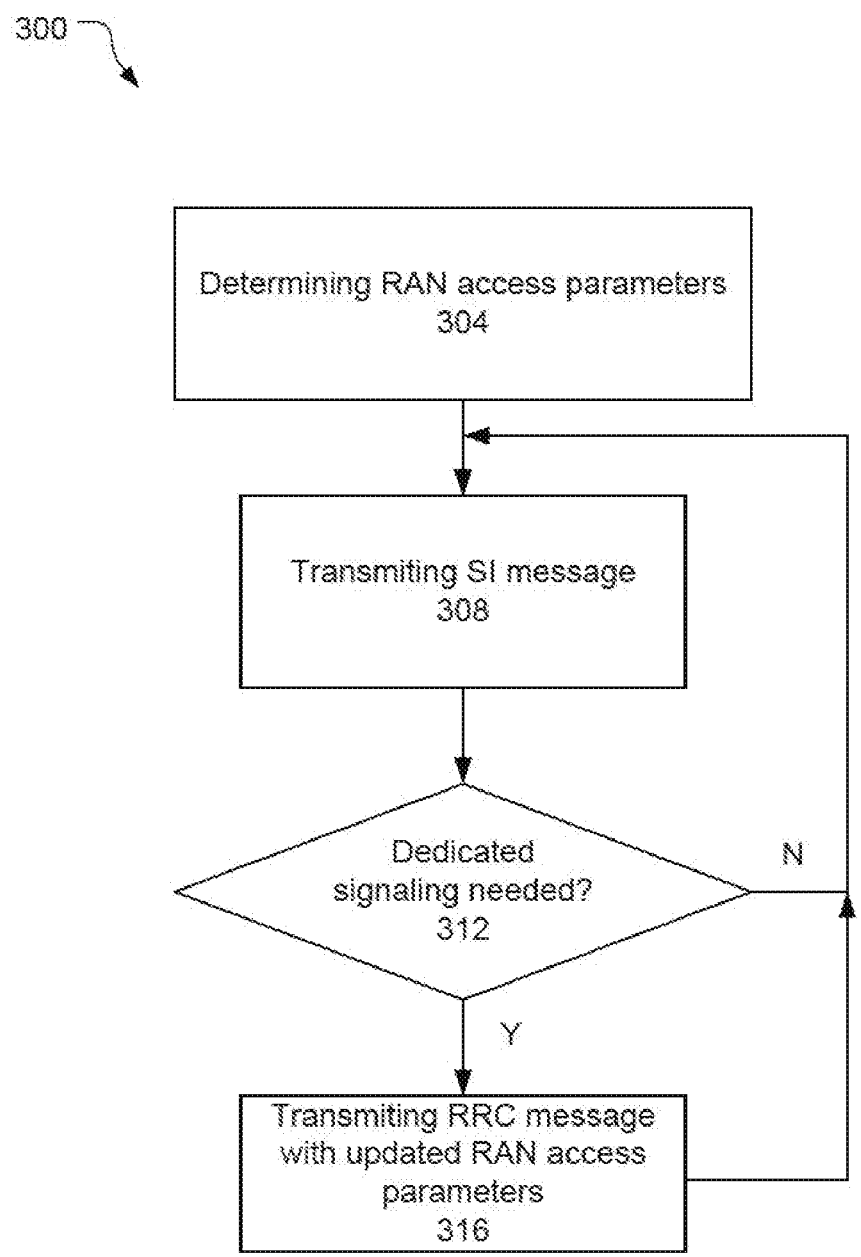
FIG. 3 is a flowchart of a configuration operation of a network node in accordance with some embodiments.

FIG. 3 is a flowchart depicting a configuration operation 300 of network node, for example, eNB 116 or network controller 148, in accordance with some embodiments. In some embodiments, the network node may include circuitry to perform the configuration operation 300. For example, the network node may include one or more non-transitory computer-readable media having instructions that, when executed, cause the network node to perform the configuration operation 300. Dedicated circuitry may additionally/alternatively be used to perform one or more aspects of the configuration operation 300. In some embodiments, some of the aspects of the configuration operation 300 may be performed by a first network node, for example, network controller 148, while other aspects of the configuration operation 300 may be performed by a second network node, for example, eNB 116.

The configuration operation 300 may include, at 304, the network node determining RAN access parameters. In some embodiments, the network node may be preconfigured with at least some of the RAN access parameters (WLAN identifiers) or receive them in reports from other nodes. In some embodiments, the network node may calculate at least some of the RAN access parameters. For example, the network node may calculate various thresholds based on its load.

The configuration operation 300 may include, at 308, transmitting system information (SI) messages that include the RAN access parameters. The SI messages may include SystemInformationBlockType1 SystemInformationBlockType17, or SystemInformationBlockType18 messages as discussed above. In some embodiments, the SI messages may be transmitted (periodically, event-driven, or otherwise) as broadcast signaling.

The configuration operation 300 may include, at 312, the network node determining whether dedicated signaling is needed. Dedicated signaling may be used if the network node determines specific or updated RAN access parameters should be provided to a particular UE.

If, at 312, it is determined that dedicated signaling is not needed, the configuration operation 300 may loop back to the transmission of the SI messages.

If, at 312, it is determined that dedicated signaling is needed, the configuration operation 300 may advance to 316 with the network node transmitting an RRC message that includes any specific or updated RAN access parameters to the UE.

Following 316, the configuration operation 300 may loop back to the transmission of the SI messages at 308.

Figure 4:
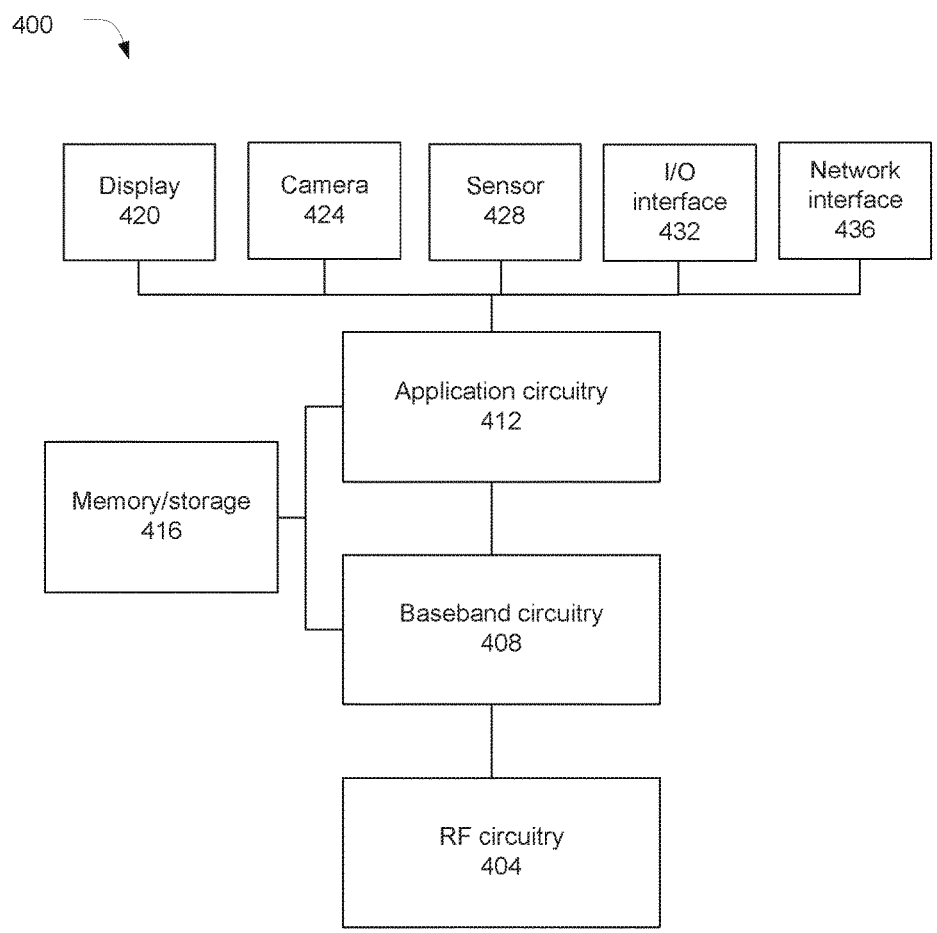
FIG. 4 is a block diagram of an example computing device that may be used to practice various embodiments described herein.

The UE 104, eNB 116, or network controller 148 as described herein may be implemented into a system using any suitable hardware, firmware, or software configured as desired. FIG. 4 illustrates, for one embodiment, an example system 400 comprising radio frequency (RF) circuitry 404, baseband circuitry 408, application circuitry 412, memory/storage 416, display 420, camera 424, sensor 428, input/output (I/O) interface 432, or network interface 436 coupled with each other as shown.

The application circuitry 412 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 416 and configured to execute instructions stored in the memory/storage 416 to enable various applications or operating systems running on the system 400.

The baseband circuitry 408 may include circuitry such as, but not limited to, one or more single-core or multi-core processors such as, for example, a baseband processor. The baseband circuitry 408 may handle various radio control functions that enable communication with one or more radio access networks via the RF circuitry 404. The radio control functions may include, but are not limited to, signal modulation, encoding, decoding, radio frequency shifting, etc. In some embodiments, the baseband circuitry 408 may provide for communication compatible with one or more radio technologies. For example, in some embodiments, the baseband circuitry 408 may support communication with an EUTRAN or other wireless metropolitan area networks (WMAN), a wireless local area network (WLAN), or a wireless personal area network (WPAN). Embodiments in which the baseband circuitry 408 is configured to support radio communications of more than one wireless protocol may be referred to as multi-mode baseband circuitry.

In various embodiments, baseband circuitry 408 may include circuitry to operate with signals that are not strictly considered as being in a baseband frequency. For example, in some embodiments, baseband circuitry 408 may include circuitry to operate with signals having an intermediate frequency, which is between a baseband frequency and a radio frequency.

In some embodiments, the control circuitry 108 or 140, or the configuration circuitry 156 may be embodied in the application circuitry 412 or the baseband circuitry 408.

RF circuitry 404 may enable communication with wireless networks using modulated electromagnetic radiation through a non-solid medium. In various embodiments, the RF circuitry 404 may include switches, filters, amplifiers, etc., to facilitate the communication with the wireless network.

In various embodiments, RF circuitry 404 may include circuitry to operate with signals that are not strictly considered as being in a radio frequency. For example, in some embodiments, RF circuitry 404 may include circuitry to operate with signals having an intermediate frequency, which is between a baseband frequency and a radio frequency.

In some embodiments, the EUTRAN radio 112, the WLAN radio 120, or the wireless transceiver 136 may be embodied in the RF circuitry 404.

In some embodiments, some or all of the constituent components of the baseband circuitry 408, the application circuitry 412, or the memory/storage 416 may be implemented together on a system on a chip (SOC).

Memory/storage 416 may be used to load and store data or instructions, for example, for system 400. Memory/storage 416 for one embodiment may include any combination of suitable volatile memory (e.g., dynamic random access memory (DRAM)) or non-volatile memory (e.g., Flash memory).

In various embodiments, the I/O interface 432 may include one or more user interfaces designed to enable user interaction with the system 400 or peripheral component interfaces designed to enable peripheral component interaction with the system 400. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 428 may include one or more sensing devices to determine environmental conditions or location information related to the system 400. In some embodiments, the sensors may include, but are not limited to, a gyro sensor, an accelerometer, a proximity sensor, an ambient light sensor, and a positioning unit. The positioning unit may also be part of, or interact with, the baseband circuitry 408 or RF circuitry 404 to communicate with components of a positioning network, e.g., a global positioning system (GPS) satellite.

In various embodiments, the display 420 may include a display (e.g., a liquid crystal display, a touch screen display, etc.).

In various embodiments, the network interface 436 may include circuitry to communicate over one or more wired networks. The transceiver 144 or 152 may be embodied in the network interface 436.

In various embodiments, the system 400 may be a mobile computing device such as, but not limited to, a laptop computing device, a tablet computing device, a netbook, an ultrabook, a smartphone, etc.; or a network node, e.g., an eNB or network controller. In various embodiments, system 400 may have more or fewer components, or different architectures.

The following paragraphs describe examples of various embodiments.

Example 1 includes a user equipment (UE) comprising: a first radio to communicate via an evolved universal terrestrial radio access network (EUTRAN); a second radio to communicate via a wireless local area network (WLAN); and control circuitry coupled with the first and second radios, the control circuitry to receive, in a broadcast system information block or a radio resource control (RRC) connection reconfiguration message dedicated to the UE, radio access network (RAN) assistance parameters for access network selection and traffic steering between the EUTRAN and the WLAN; and steer traffic through the first radio or the second radio based on the RAN assistance parameters.

Example 2 includes the UE of example 1, wherein the RAN assistance parameters are first RAN assistance parameters in the RRC connection reconfiguration message, and the control circuitry is further to: receive second RAN assistance parameters in the system information block; discard the second RAN assistance parameters; and save the first RAN assistance parameters.

Example 3 includes the UE of any of examples 1-2, wherein the control circuitry is to receive the RAN assistance parameters in an information element in the RRC connection reconfiguration message.

Example 4 includes the UE of example 3, wherein the RAN assistance parameters include a timer value and the control circuitry is to: set a timer with the timer value; start the timer upon entering an RRC idle mode; and discard the RAN assistance parameters received in RRC connection reconfiguration message upon expiration of the timer.

Example 5 includes the UE of any of examples 1-4, wherein the RAN assistance parameters include a WLAN identifier that corresponds to the WLAN, a reference signal received power (RSRP) threshold value, and a reference signal received quality (RSRQ) threshold value, and the control circuitry is further to: transmit traffic over the EUTRAN via the first radio; determine that a measured cell receive level value of the EUTRAN is less than the RSRP threshold or a measured cell quality value of the EUTRAN is less than the RSRQ threshold; and steer traffic to the WLAN via the second radio based on said determination that the measured RSRP of the EUTRAN is less than the RSRP threshold or the measured RSRQ of the EUTRAN is less than the RSRQ threshold.

Example 6 includes the UE of example 5, wherein the RAN assistance parameters further include a WLAN channel utilization threshold, a WLAN downlink backhaul rate threshold, a WLAN uplink backhaul rate threshold, and a WLAN beacon received signal strength indicator (RSSI) threshold, and the control circuitry is further to: determine that a WLAN channel utilization is less than the WLAN channel utilization threshold, a WLAN downlink backhaul rate is greater than the WLAN downlink backhaul rate threshold, a WLAN uplink backhaul rate is greater than the WLAN uplink backhaul rate threshold, and a beacon RSSI is greater than the WLAN beacon RSSI threshold; and steer traffic to the WLAN via the second radio based further on said determination that the WLAN channel utilization is less than the WLAN channel utilization threshold, the WLAN downlink backhaul rate is greater than the WLAN downlink backhaul rate threshold, the WLAN uplink backhaul rate is greater than the WLAN uplink backhaul rate threshold, and the beacon RSSI is greater than the WLAN beacon RSSI threshold.

Example 7 includes the UE of any of examples 1-6, wherein the RAN assistance parameters include a WLAN channel utilization threshold, a WLAN downlink backhaul rate threshold, a WLAN uplink backhaul rate threshold, a WLAN beacon received signal strength indicator (RSSI) threshold, and a WLAN beacon received signal strength indicator (RSSI) threshold; and the controller is further to: transmit traffic over the WLAN via the second radio; determine a WLAN channel utilization is greater than the WLAN channel utilization threshold, a WLAN downlink backhaul rate is less than the WLAN downlink backhaul rate threshold, a WLAN uplink backhaul rate is less than the WLAN uplink backhaul rate threshold, or a beacon RSSI is less than the WLAN beacon RSSI threshold; and steer traffic to the EUTRAN via the first radio based on said determination that the WLAN channel utilization is greater than the WLAN channel utilization threshold, the WLAN downlink backhaul rate is less than the WLAN downlink backhaul rate threshold, the WLAN uplink backhaul rate is less than the WLAN uplink backhaul rate threshold, or the beacon RSSI is less than the WLAN beacon RSSI threshold.

Example 8 includes the UE of example 7, wherein the RAN assistance parameters further include a reference signal received power (RSRP) threshold value and a reference signal received quality (RSRQ) threshold value, and the control circuitry is further to: determine a measured cell receive level value of the EUTRAN is greater than the RSRP threshold and a measured cell quality value of the EUTRAN is greater than the RSRQ threshold; and steer traffic to the EUTRAN via the first radio based on said determination that the measured cell receive level value corresponding to the EUTRAN is greater than the RSRP threshold and the measured cell quality value corresponding to the EUTRAN is greater than the RSRQ threshold.

Example 9 includes the UE of any of examples 1-8, further comprising: multi-mode baseband circuitry coupled with the first and second radios.

Example 10 includes enhanced node B (eNB) circuitry comprising: control circuitry to determine a set of RAN assistance parameters for each of a plurality of public land mobile networks (PLMNs) served by the eNB, wherein individual sets of the RAN assistance parameters include first evolved universal terrestrial radio access network (EUTRAN) thresholds for steering traffic from an EUTRAN to a wireless local area network (WLAN), second EUTRAN thresholds for steering traffic from a WLAN to an EUTRAN, first WLAN thresholds for steering traffic from an EUTRAN to a WLAN, and second WLAN thresholds for steering traffic from a WLAN to an EUTRAN; and to generate dedicated or broadcast signaling messages that include the RAN assistance parameters for each of the plurality of PLMNs; and a wireless transceiver to transmit the dedicated or broadcast signaling messages to one or more user equipments (UEs) in the EUTRAN cell.

In some embodiments, the eNB circuitry of example 10 may further include a transceiver to receive a first RAN assistance parameter of the set of RAN assistance parameters from a network node, wherein the first RAN assistance parameter is a WLAN identifier.

Example 11 includes the eNB circuitry of example 10, wherein the control circuitry is to generate system information blocks that include the RAN assistance parameters and the wireless transceiver is to transmit the system information blocks.

Example 12 includes the eNB circuitry of example 10, wherein the control circuitry is to generate a radio resource control (RRC) connection reconfiguration message that includes the RAN assistance parameters, and the wireless transceiver is to transmit the RRC connection reconfiguration messages.

Example 13 includes the eNB circuitry of any of examples 10-12, wherein the first EUTRAN thresholds include a first reference signal received power (RSRP) threshold or a first reference signal received quality (RSRQ) threshold, and the second EUTRAN thresholds include a second RSRQ threshold or a second RSRQ threshold.

Example 14 includes the eNB circuitry of any of examples 10-13, wherein the first WLAN thresholds include a first channel utilization threshold, a first WLAN downlink backhaul rate threshold, a first WLAN uplink backhaul rate, or a first WLAN beacon received signal strength indicator (RSSI) and the second WLAN thresholds include a second channel utilization threshold, a second WLAN downlink backhaul rate threshold, a second WLAN uplink backhaul rate, or a second WLAN beacon received signal strength indicator (RSSI).

Example 15 includes one or more non-transitory computer-readable media having instructions that, when executed, cause a user equipment (UE) to: process a system information message or a radio resource control (RRC) message to determine radio access network (RAN) assistance parameters; determine conditions of first and second access networks; determine that the conditions of the first and second access networks satisfy access network selection and traffic steering (ANSTS) rules for a predetermined period of time based on the RAN assistance parameters; and steer traffic from the first access network to the second access network based on said determination that the conditions of the first and second access networks satisfy the ANSTS for the predetermined period of time.

Example 16 includes the one or more non-transitory computer-readable media of example 15, wherein the RAN assistance parameters include first evolved universal terrestrial radio access network (EUTRAN) thresholds for steering traffic from an EUTRAN to a wireless local area network (WLAN), second EUTRAN thresholds for steering traffic from a WLAN to an EUTRAN, first WLAN thresholds for steering traffic from an EUTRAN to a WLAN, and second WLAN thresholds for steering traffic from a WLAN to an EUTRAN.

Example 17 includes the one or more non-transitory computer-readable media of any of examples 15-16, wherein the first access network is an evolved universal terrestrial radio access network (EUTRAN), the second access network is a wireless local area network (WLAN), the RAN assistance parameters include a WLAN identifier that corresponds to the WLAN, a reference signal received power (RSRP) threshold value, and a reference signal received quality (RSRQ) threshold value, and the instructions, when executed, further cause the UE to: determine that a measured cell receive level value of the EUTRAN is less than the RSRP threshold or a measured cell quality value of the EUTRAN is less than the RSRQ threshold; and steer traffic to the WLAN based on said determination that the measured RSRP of the EUTRAN is less than the RSRP threshold or the measured RSRQ of the EUTRAN is less than the RSRQ threshold.

Example 18 includes the one or more non-transitory computer-readable media of example 17, wherein the RAN assistance parameters further include a WLAN channel utilization threshold, a WLAN downlink backhaul rate threshold, a WLAN uplink backhaul rate threshold, and a WLAN beacon received signal strength indicator (RSSI) threshold, and the instructions, when executed, further cause the UE to: determine that a WLAN channel utilization is less than the WLAN channel utilization threshold, a WLAN downlink backhaul rate is greater than the WLAN downlink backhaul rate threshold, a WLAN uplink backhaul rate is greater than the WLAN uplink backhaul rate threshold, and a beacon RSSI is greater than the WLAN beacon RSSI threshold; and steer traffic to the WLAN based further on said determination that the WLAN channel utilization is less than the WLAN channel utilization threshold, the WLAN downlink backhaul rate is greater than the WLAN downlink backhaul rate threshold, the WLAN uplink backhaul rate is greater than the WLAN uplink backhaul rate threshold, and the beacon RSSI is greater than the WLAN beacon RSSI threshold.

Example 19 includes the one or more non-transitory computer-readable media of any of examples 15-18, wherein the first access network is a wireless local area network (WLAN), the second access network is an evolved universal terrestrial radio access network (EUTRAN), the RAN assistance parameters include a WLAN channel utilization threshold, a WLAN downlink backhaul rate threshold, a WLAN uplink backhaul rate threshold, a WLAN beacon received signal strength indicator (RSSI) threshold, and a WLAN beacon received signal strength indicator (RSSI) threshold; and the instructions, when executed, further cause the UE to: determine a WLAN channel utilization is greater than the WLAN channel utilization threshold, a WLAN downlink backhaul rate is less than the WLAN downlink backhaul rate threshold, a WLAN uplink backhaul rate is less than the WLAN uplink backhaul rate threshold, or a beacon RSSI is less than the WLAN beacon RSSI threshold; and steer traffic to the EUTRAN based on said determination that the WLAN channel utilization is greater than the WLAN channel utilization threshold, the WLAN downlink backhaul rate is less than the WLAN downlink backhaul rate threshold, the WLAN uplink backhaul rate is less than the WLAN uplink backhaul rate threshold, or the beacon RSSI is less than the WLAN beacon RSSI threshold.

Example 20 includes the one or more non-transitory computer-readable media of example 19, wherein the RAN assistance parameters further include a reference signal received power (RSRP) threshold value and a reference signal received quality (RSRQ) threshold value, and the instructions, when executed, further cause the UE to: determine a measured cell receive level value of the EUTRAN is greater than the RSRP threshold and a measured cell quality value of the EUTRAN is greater than the RSRQ threshold; and steer traffic to the EUTRAN based on said determination that the measured cell receive level value corresponding to the EUTRAN is greater than the RSRP threshold and the measured cell quality value corresponding to the EUTRAN is greater than the RSRQ threshold.

Example 21 includes a user equipment (UE) comprising: means for processing a system information message or a radio resource control (RRC) message to determine radio access network (RAN) assistance parameters; means for determining conditions of first and second access networks; means for determining that the conditions of the first and second access networks satisfy access network selection and traffic steering (ANSTS) rules for a predetermined period of time based on the RAN assistance parameters; and means for steering traffic from the first access network to the second access network based on said determination that the conditions of the first and second access networks satisfy the ANSTS for the predetermined period of time.

Example 22 includes the UE of example 21, wherein the RAN assistance parameters include first evolved universal terrestrial radio access network (EUTRAN) thresholds for steering traffic from an EUTRAN to a wireless local area network (WLAN), second EUTRAN thresholds for steering traffic from a WLAN to an EUTRAN, first WLAN thresholds for steering traffic from an EUTRAN to a WLAN, and second WLAN thresholds for steering traffic from a WLAN to an EUTRAN.

Example 23 includes the UE of any of examples 21-22, wherein the first access network is an evolved universal terrestrial radio access network (EUTRAN), the second access network is a wireless local area network (WLAN), the RAN assistance parameters include a WLAN identifier that corresponds to the WLAN, a reference signal received power (RSRP) threshold value, and a reference signal received quality (RSRQ) threshold value, and the UE further comprises: means for determining that a measured cell receive level value of the EUTRAN is less than the RSRP threshold or a measured cell quality value of the EUTRAN is less than the RSRQ threshold; and means for steering traffic to the WLAN based on said determination that the measured RSRP of the EUTRAN is less than the RSRP threshold or the measured RSRQ of the EUTRAN is less than the RSRQ threshold.

Example 24 includes the UE of example 23, wherein the RAN assistance parameters further include a WLAN channel utilization threshold, a WLAN downlink backhaul rate threshold, a WLAN uplink backhaul rate threshold, and a WLAN beacon received signal strength indicator (RSSI) threshold, and the UE further comprises: means for determining that a WLAN channel utilization is less than the WLAN channel utilization threshold, a WLAN downlink backhaul rate is greater than the WLAN downlink backhaul rate threshold, a WLAN uplink backhaul rate is greater than the WLAN uplink backhaul rate threshold, and a beacon RSSI is greater than the WLAN beacon RSSI threshold; and means for steering traffic to the WLAN based further on said determination that the WLAN channel utilization is less than the WLAN channel utilization threshold, the WLAN downlink backhaul rate is greater than the WLAN downlink backhaul rate threshold, the WLAN uplink backhaul rate is greater than the WLAN uplink backhaul rate threshold, and the beacon RSSI is greater than the WLAN beacon RSSI threshold.

Example 25 includes the UE of any of examples 21-24, wherein the first access network is a wireless local area network (WLAN), the second access network is an evolved universal terrestrial radio access network (EUTRAN), the RAN assistance parameters include a WLAN channel utilization threshold, a WLAN downlink backhaul rate threshold, a WLAN uplink backhaul rate threshold, a WLAN beacon received signal strength indicator (RSSI) threshold, and a WLAN beacon received signal strength indicator (RSSI) threshold; and the UE further comprises: means for determining a WLAN channel utilization is greater than the WLAN channel utilization threshold, a WLAN downlink backhaul rate is less than the WLAN downlink backhaul rate threshold, a WLAN uplink backhaul rate is less than the WLAN uplink backhaul rate threshold, or a beacon RSSI is less than the WLAN beacon RSSI threshold; and means for steering traffic to the EUTRAN based on said determination that the WLAN channel utilization is greater than the WLAN channel utilization threshold, the WLAN downlink backhaul rate is less than the WLAN downlink backhaul rate threshold, the WLAN uplink backhaul rate is less than the WLAN uplink backhaul rate threshold, or the beacon RSSI is less than the WLAN beacon RSSI threshold.

Example 26 includes the UE of example 25, wherein the RAN assistance parameters further include a reference signal received power (RSRP) threshold value and a reference signal received quality (RSRQ) threshold value, and the UE further comprises: means for determining a measured cell receive level value of the EUTRAN is greater than the RSRP threshold and a measured cell quality value of the EUTRAN is greater than the RSRQ threshold; and means for steering traffic to the EUTRAN based on said determination that the measured cell receive level value corresponding to the EUTRAN is greater than the RSRP threshold and the measured cell quality value corresponding to the EUTRAN is greater than the RSRQ threshold.

Example 27 includes a method of operating an enhanced node B (eNB) comprising: receiving a set of RAN assistance parameters for each of a plurality of public land mobile networks (PLMNs) served by the eNB, wherein individual sets of the RAN assistance parameters include first evolved universal terrestrial radio access network (EUTRAN) thresholds for steering traffic from an EUTRAN to a wireless local area network (WLAN), second EUTRAN thresholds for steering traffic from a WLAN to an EUTRAN, first WLAN thresholds for steering traffic from an EUTRAN to a WLAN, and second WLAN thresholds for steering traffic from a WLAN to an EUTRAN; generating dedicated or broadcast signaling messages that include the RAN assistance parameters for each of the plurality of PLMNs; and transmitting the dedicated or broadcast signaling messages to one or more user equipments (UEs) in the EUTRAN cell.

Example 28 includes the method of example 27, wherein said generating comprises generating system information blocks that include the RAN assistance parameters and said transmitting comprises transmitting the system information blocks.

Example 29 includes the method of example 27, wherein said generating comprises generating a radio resource control (RRC) connection reconfiguration message that includes the RAN assistance parameters, and the wireless transceiver is to transmit the RRC connection reconfiguration messages.

Example 30 includes the method of any of examples 27-29, wherein the first EUTRAN thresholds include a first reference signal received power (RSRP) threshold or a first reference signal received quality (RSRQ) threshold, and the second EUTRAN thresholds include a second RSRQ threshold or a second RSRQ threshold.

Example 31 includes the method of any of examples 27-30, wherein the first WLAN thresholds include a first channel utilization threshold, a first WLAN downlink backhaul rate threshold, a first WLAN uplink backhaul rate, or a first WLAN beacon received signal strength indicator (RSSI) and the second WLAN thresholds include a second channel utilization threshold, a second WLAN downlink backhaul rate threshold, a second WLAN uplink backhaul rate, or a second WLAN beacon received signal strength indicator (RSSI).

Example 32 includes an apparatus to perform the method of any of examples 27-31.

Example 33 includes one or more non-transitory, computer-readable media having instructions that, when executed, cause an eNB to perform the method of any of claims 27-31.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. One or more computer-readable media having instructions that, when executed, cause an evolved Node B ("eNB") to:
    generate a radio resource control ("RRC") connection reconfiguration message or a system information block message to include radio access network ("RAN") assistance parameters for access network selection and traffic steering between an evolved universal terrestrial radio access network ("EUTRAN") and a wireless local area network ("WLAN"), wherein the RAN assistance parameters include:
        a WLAN beacon received signal strength indicator ("RSSI") threshold;
        an EUTRAN reference signal received power ("RSRP") threshold or an EUTRAN reference signal received quality ("RSRQ") threshold; and
        a timer parameter to provide a predetermined time interval that a plurality of steering conditions are to be met before user equipment ("UE") traffic is to be steered to the WLAN; and
    cause the RRC connection reconfiguration message or the system information block message to be transmitted, wherein, at least one of:
        the RAN assistance parameters further include a WLAN downlink backhaul rate threshold and the plurality of steering conditions further include an available downlink bandwidth of the WLAN being greater than the WLAN downlink backhaul rate threshold, or
        the RAN assistance parameters further include a WLAN uplink backhaul rate threshold and the plurality of steering conditions further include an available uplink bandwidth of the WLAN being greater than the WLAN uplink backhaul rate threshold.

2. The one or more computer-readable media of claim 1, wherein the instructions, when executed, further cause the eNB to:
    transmit a message that include an identifier of the WLAN.

3. The one or more computer-readable media of claim 2, wherein the identifier is a service set identifier, a basic service set identifier, or a homogenous extended service set identifier.

4. The one or more computer-readable media of claim 1, wherein the plurality of steering conditions include: an EUTRAN RSRP being less than the EUTRAN RSRP threshold or an EUTRAN RSRQ being less than the EUTRAN RSRQ threshold; and a WLAN RSSI being greater than the WLAN beacon RSSI threshold.

5. The one or more computer-readable media of claim 4, wherein the RAN assistance parameters further include a WLAN channel utilization threshold and the plurality of steering conditions further include a channel utilization of the WLAN being less than the WLAN channel utilization threshold.

6. An apparatus comprising:
    baseband circuitry to generate a radio resource control ("RRC") connection reconfiguration message or a system information block message to include radio access network ("RAN") assistance parameters for access network selection and traffic steering between an evolved universal terrestrial radio access network ("EUTRAN") and a wireless local area network ("WLAN"), wherein the RAN assistance parameters include:
        a WLAN beacon received signal strength indicator ("RSSI") threshold;
        an EUTRAN reference signal received power ("RSRP") threshold or an EUTRAN reference signal received quality ("RSRQ") threshold; and
        a timer parameter to provide a predetermined time interval that a plurality of steering conditions are to be met before UE traffic is to be steered to the WLAN; and
    radio frequency circuitry, coupled with the baseband circuitry, to transmit the RRC connection reconfiguration message or the system information block message, wherein, at least one of:
        the RAN assistance parameters further include a WLAN downlink backhaul rate threshold and the plurality of steering conditions further include an available downlink bandwidth of the WLAN being greater than the WLAN downlink backhaul rate threshold, or
        the RAN assistance parameters further include a WLAN uplink backhaul rate threshold and the plurality of steering conditions further include an available uplink bandwidth of the WLAN being greater than the WLAN uplink backhaul rate threshold.

7. The apparatus of claim 6, wherein the baseband circuitry is to generate a message that includes an identifier of the WLAN and the radio frequency circuitry is to transmit the message to a UE.

8. The apparatus of claim 6, wherein the identifier is a service set identifier, a basic service set identifier, or a homogenous extended service set identifier.

9. The apparatus of claim 6, wherein the plurality of steering conditions include: an EUTRAN RSRP being less than the EUTRAN RSRP threshold or an EUTRAN RSRQ being less than the EUTRAN RSRQ threshold; and a WLAN RSSI being greater than the WLAN beacon RSSI threshold.

10. The apparatus of claim 9, wherein the RAN assistance parameters further include a WLAN channel utilization threshold and the plurality of steering conditions further include a channel utilization of the WLAN being less than the WLAN channel utilization threshold.

11. An apparatus comprising:
means for determining, based on a radio resource control ("RRC") connection reconfiguration message or a system information block message, radio access network ("RAN") assistance parameters for access network selection and traffic steering between an evolved universal terrestrial radio access network ("EUTRAN") and a wireless local area network ("WLAN"), wherein the RAN assistance parameters include:
 a WLAN beacon received signal strength indicator ("RSSI") threshold; and
 an EUTRAN reference signal received power ("RSRP") threshold or an EUTRAN reference signal received quality ("RSRQ") threshold;
means for determining an EUTRAN RSRP or an EUTRAN RSRQ;
means for determining, based on a beacon in the WLAN, a WLAN RSSI;
means for determining a plurality of steering conditions are met for a predetermined time interval, the plurality of steering conditions to include:
 the EUTRAN RSRP being less than the EUTRAN RSRP threshold or the EUTRAN RSRQ being less than the EUTRAN RSRQ threshold; and the WLAN RSSI being greater than the WLAN beacon RSSI threshold;
means for steering traffic from a first radio of the UE that communicates via the EUTRAN to a second radio of the UE that communicates via the WLAN based on said determination that the plurality of steering conditions are met for the predetermined time interval,
wherein, at least one of:
 the RAN assistance parameters further include a WLAN downlink backhaul rate threshold and the plurality of steering conditions further include an available downlink bandwidth of the WLAN being greater than the WLAN downlink backhaul rate threshold, or
 the RAN assistance parameters further include a WLAN uplink backhaul rate threshold and the plurality of steering conditions further include an available uplink bandwidth of the WLAN being greater than the WLAN uplink backhaul rate threshold.

12. The apparatus of claim 11, further comprising:
means for determining, based on a message from an eNB of the EUTRAN, an identifier; and
means for identifying the WLAN based on the identifier, wherein the identifier is a service set identifier, a basic service set identifier, or a homogenous extended service set identifier.

13. The apparatus of claim 11, wherein the RAN assistance parameters further include a WLAN channel utilization threshold and the plurality of steering conditions further include a channel utilization of the WLAN being less than the WLAN channel utilization threshold.

14. The apparatus of claim 11, wherein the RAN assistance parameters further include a timer parameter to provide the predetermined time interval.

\* \* \* \* \*